(12) United States Patent
Bishop

(10) Patent No.: US 7,395,848 B2
(45) Date of Patent: Jul. 8, 2008

(54) TIRE BEAD ROLLING TOOL OR TIRE IRON AND METHOD OF USE

(76) Inventor: Kenn Bishop, P.O. Box 1759, Moses Lake, WA (US) 98837

( * ) Notice: Subject to any disclaimer, the term of this patent is extended or adjusted under 35 U.S.C. 154(b) by 0 days.

(21) Appl. No.: 11/519,171

(22) Filed: Sep. 11, 2006

(65) Prior Publication Data

US 2008/0060765 A1 Mar. 13, 2008

(51) Int. Cl.
*B60C 25/02* (2006.01)

(52) U.S. Cl. ...................... 157/1.17; 157/1.3

(58) Field of Classification Search ............ 157/1, 157/1.1, 1.3, 1.17, 1.22
See application file for complete search history.

(56) References Cited

U.S. PATENT DOCUMENTS

| | | | |
|---|---|---|---|
| 3,851,694 A * | 12/1974 | Brosene, Jr. ............ 157/1 |
| 3,867,975 A | 2/1975 | Johnson |
| 4,263,958 A | 4/1981 | Corless |
| 4,415,014 A | 11/1983 | Turpin |
| 4,641,699 A | 2/1987 | Giles et al. |
| 4,787,433 A | 11/1988 | Thomas |
| 4,804,030 A | 2/1989 | Mandelko |
| 4,848,731 A | 7/1989 | Ringo |
| 4,884,611 A | 12/1989 | Schmidt |
| 4,947,918 A | 8/1990 | Unrau |
| 5,009,257 A | 4/1991 | Reeves |
| 5,269,358 A | 12/1993 | Ling |
| 5,343,921 A * | 9/1994 | Kusner .............. 157/1.3 |
| 5,363,897 A * | 11/1994 | Branch .............. 157/1.3 |
| 5,421,392 A | 6/1995 | Unrau |
| 5,649,582 A | 7/1997 | Hjorth-Hansen |
| 5,876,526 A | 3/1999 | Hamade et al. |
| 5,971,052 A | 10/1999 | Kliskey |
| 6,024,151 A * | 2/2000 | Ochoa .............. 157/1.3 |
| 6,536,501 B1 | 3/2003 | Bishop |
| 2004/0129388 A1 * | 7/2004 | Brazil .............. 157/1.3 |

* cited by examiner

*Primary Examiner*—Jacob K. Ackun, Jr.
(74) *Attorney, Agent, or Firm*—Clark A. Puntigam; Jensen & Puntigam, P.S.

(57) ABSTRACT

An apparatus for the mounting/dismounting of tires on wheels. A bead breaker module with elongated pressure clamps pivotally moved by an actuator such that the elongated pressure clamps extend from the perimeter of a tire to a position proximal the tire side and bead; the actuator urges the elongated pressure clamps together to disengage the bead from the rim. A tire mount/dismount module having a base plate affixed to a wheel; a receiver and drive assembly rotatably affixed to the base plate with a receiver receiving a bead rolling tool which is inserted between a tire bead and wheel rim and which, when the receiver and drive assembly is rotated, disengages the bead from the rim or, when installing a tire, engages the bead relative to the rim. A bead rolling or tire iron tool has elliptical cross-sections proximal its ends and extensions, bearing surfaces at its bottom, a rectangular cross-section intermediate its ends and a slot intermediate its ends.

10 Claims, 23 Drawing Sheets

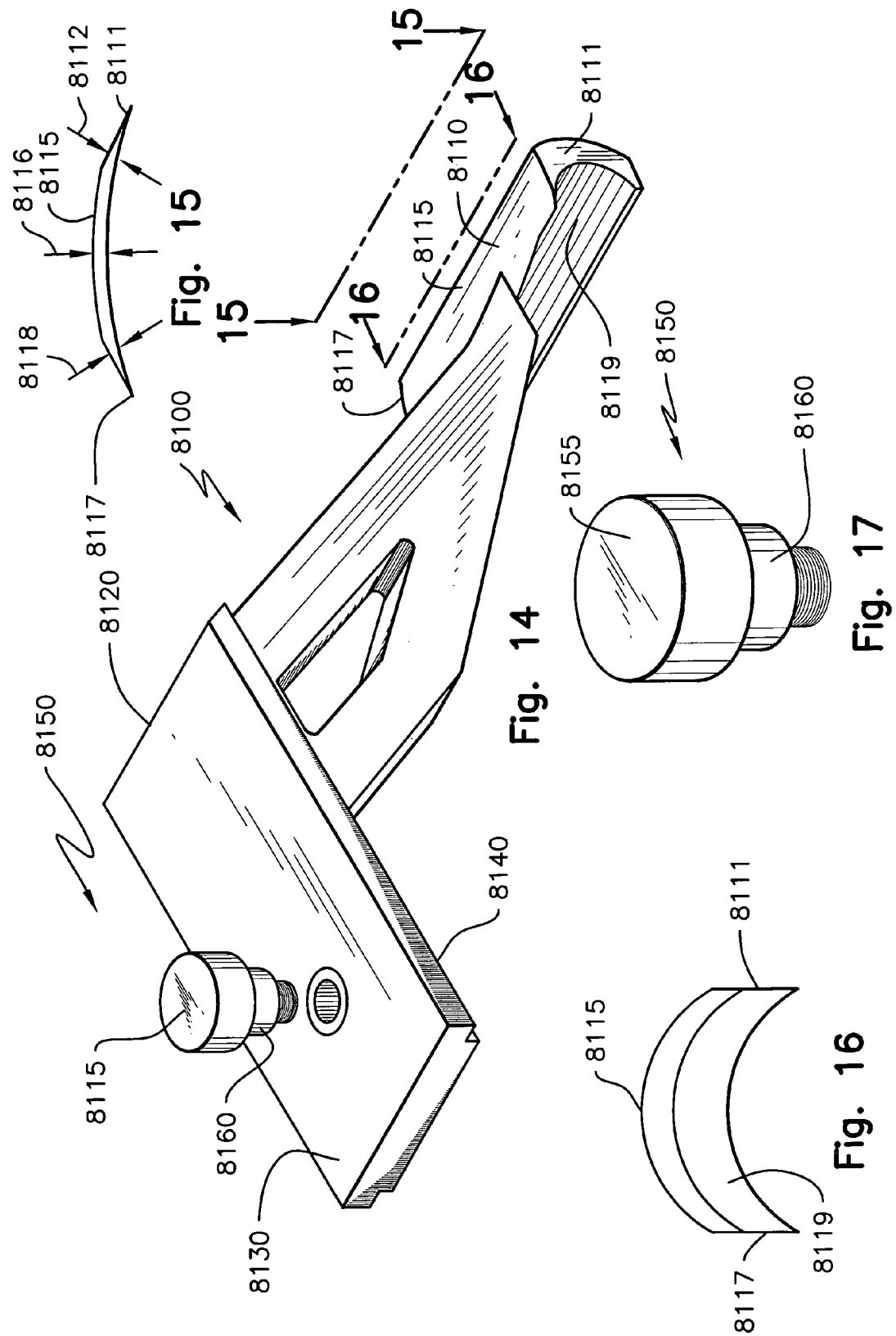

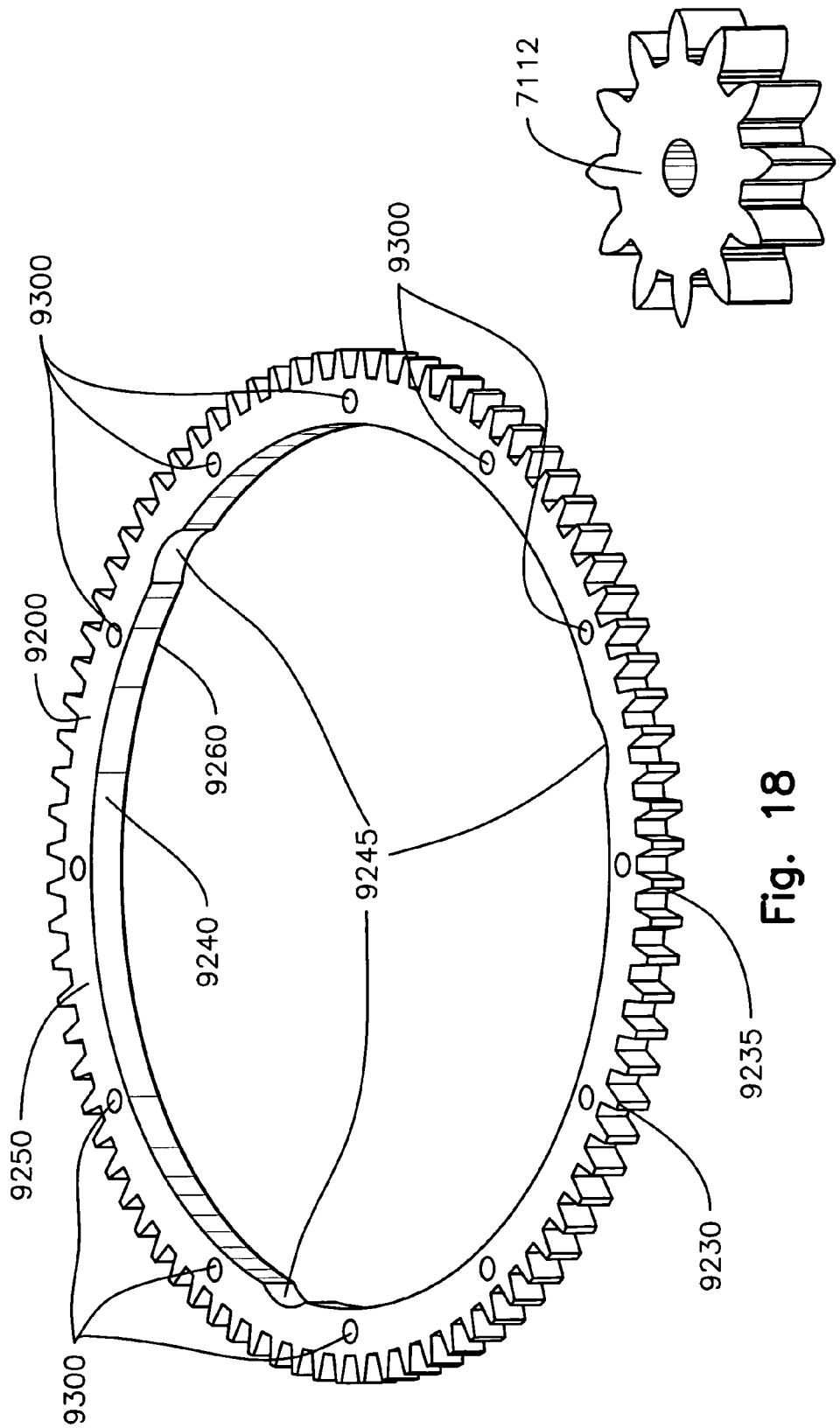

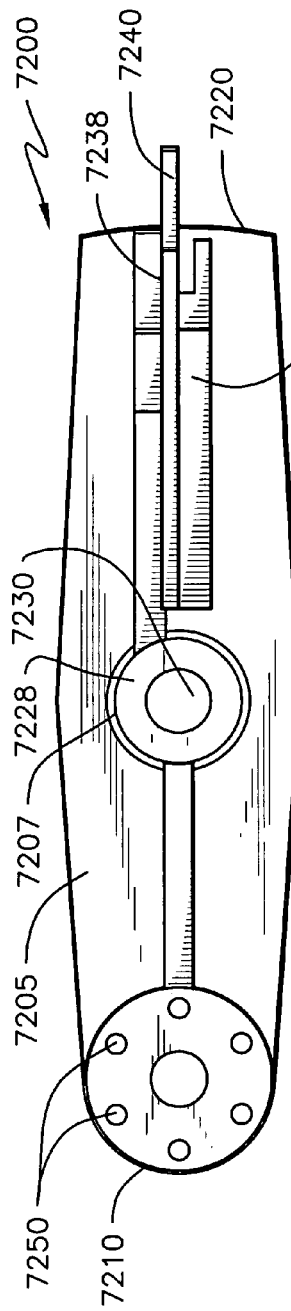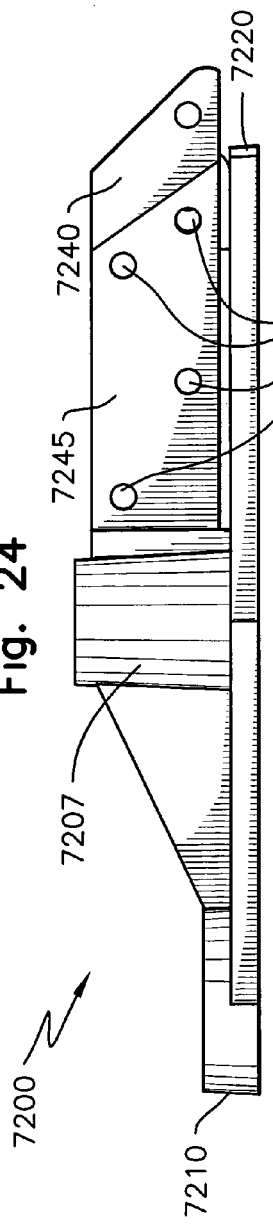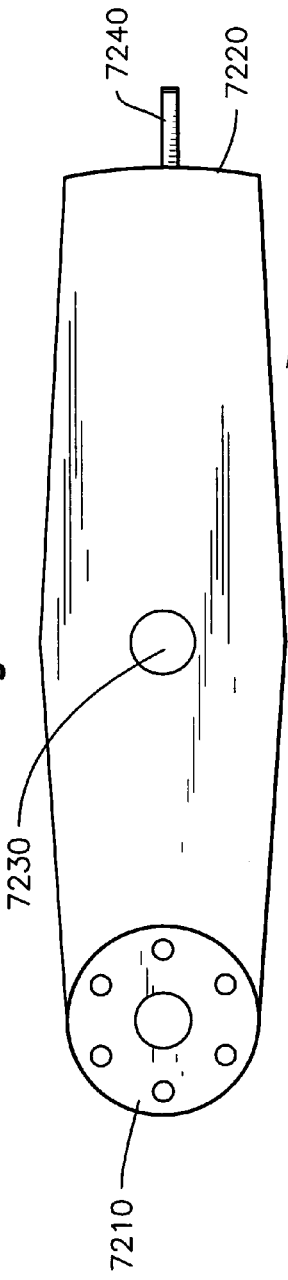

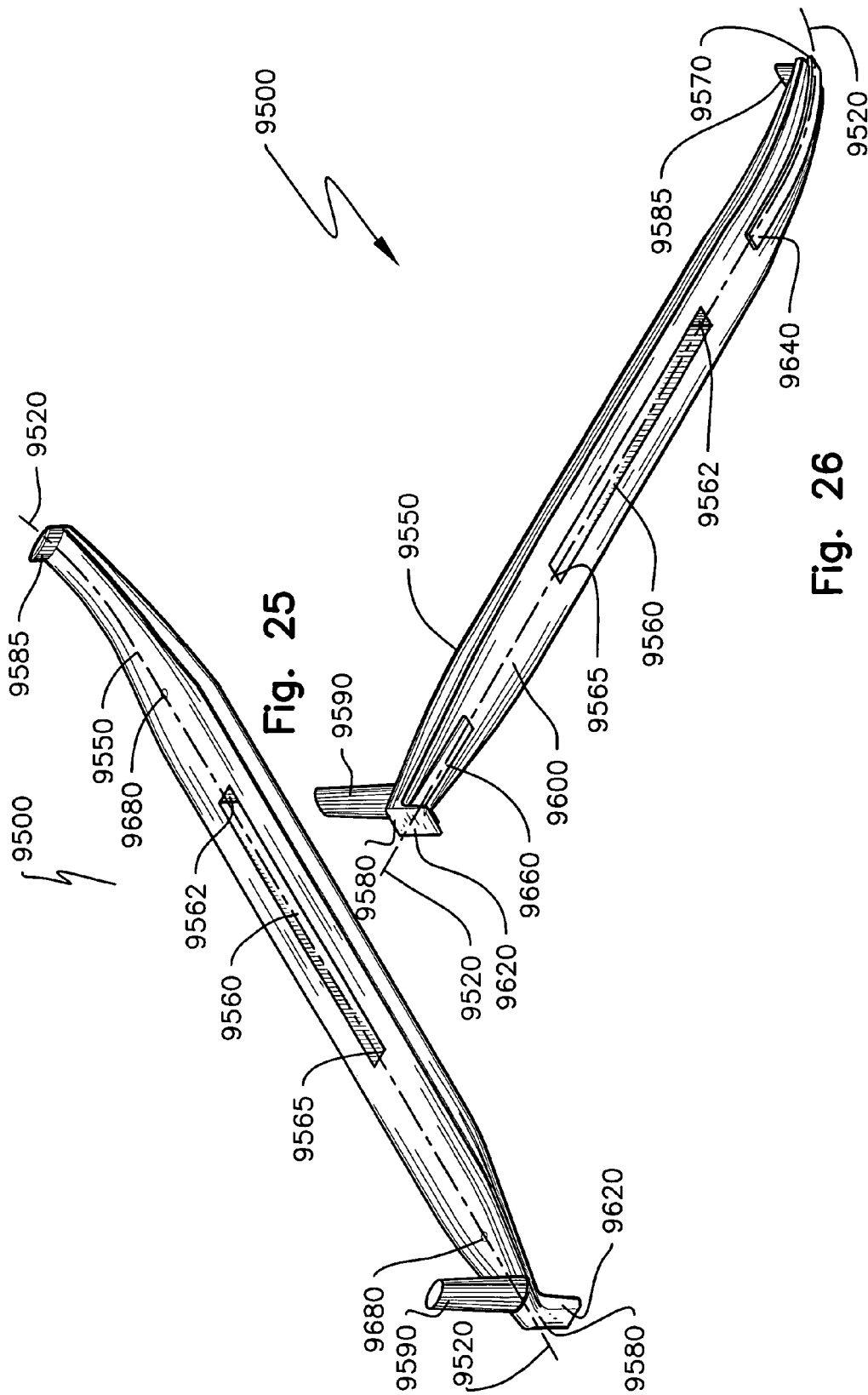

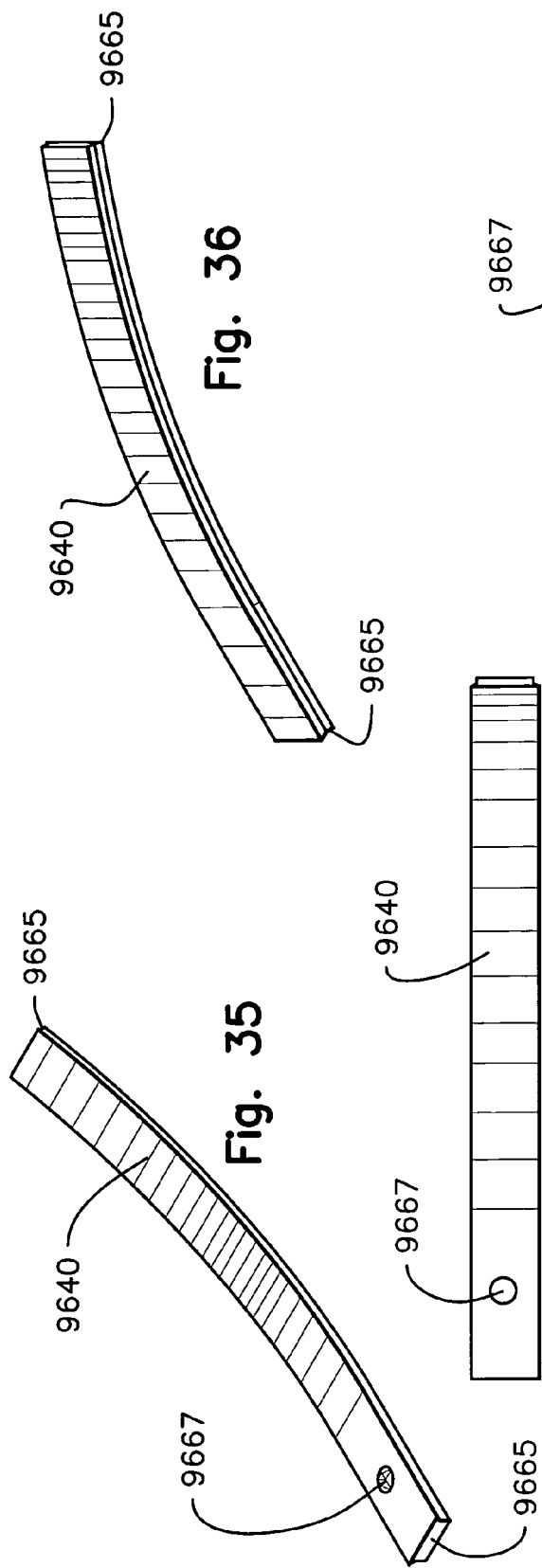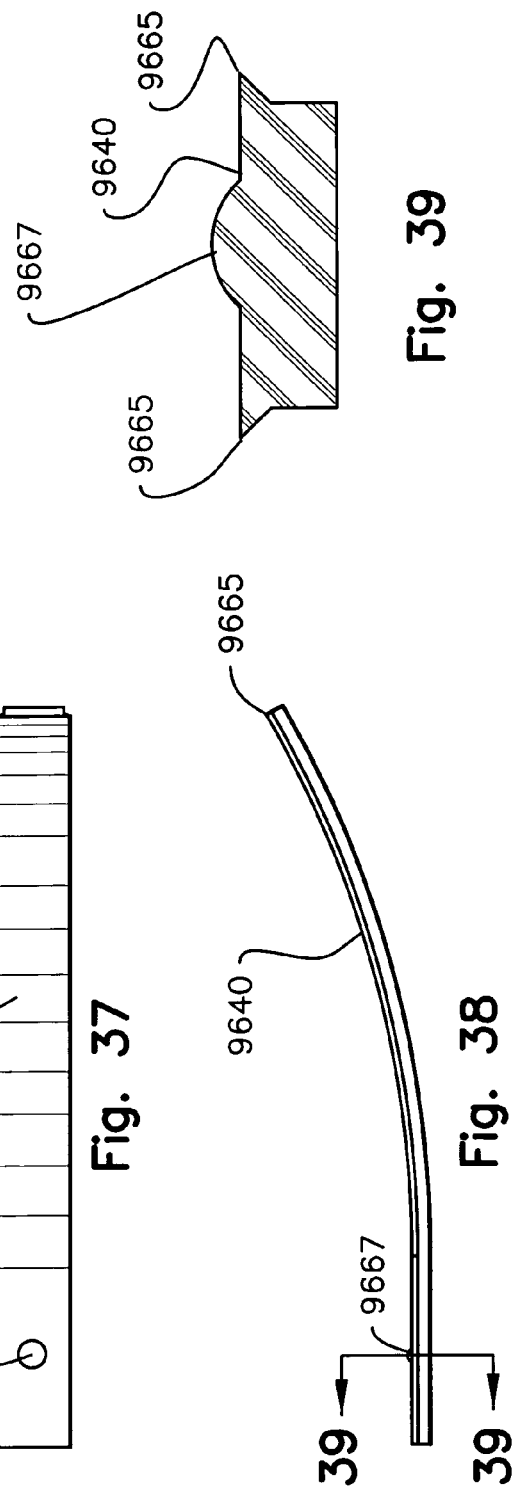

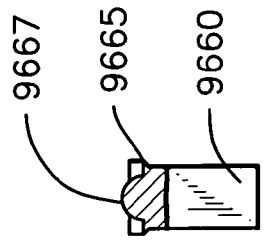
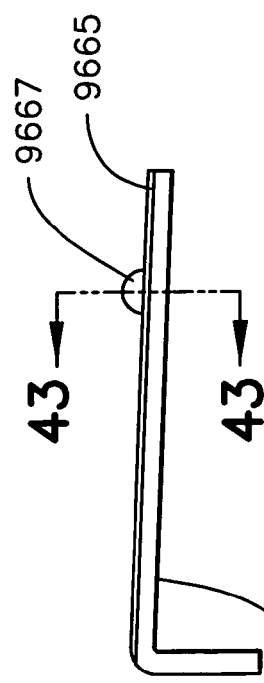
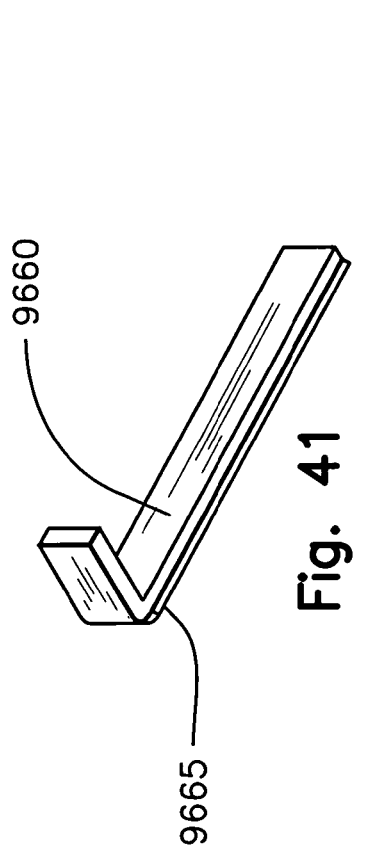
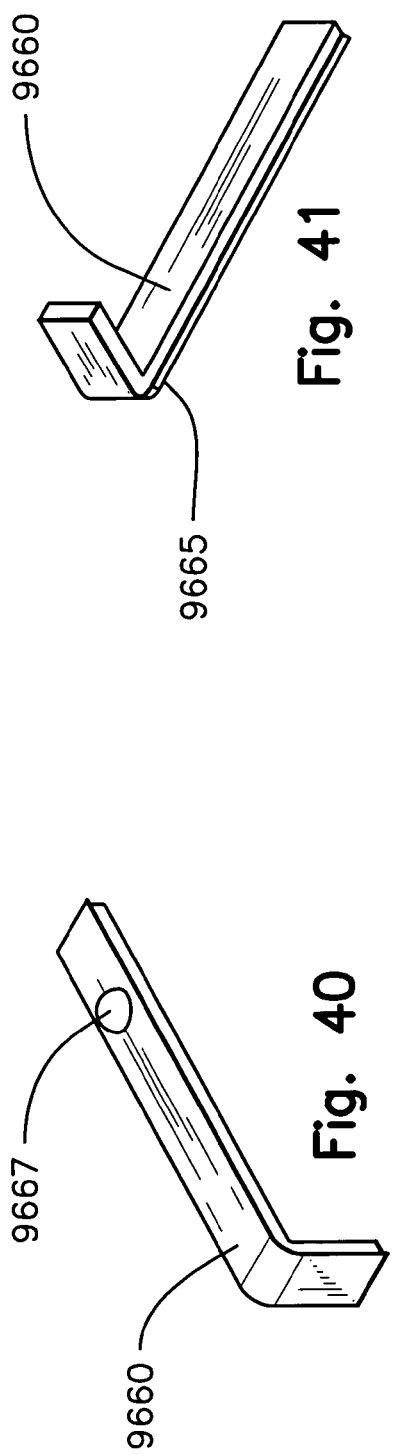

TIRE BEAD ROLLING TOOL OR TIRE IRON AND METHOD OF USE

FIELD OF THE INVENTION

The present disclosure relates to changing automotive and vehicle tires. The apparatus relates in particular to mounting/dismounting truck tires.

BACKGROUND OF THE INVENTION

Truck tire failure poses time, labor and transit delay. Historical practices required transport of replacement tires and tire changing equipment imposing the labor on the driver of changing the failed tire. More recently trucking companies have provided for communication means allowing a driver to notify a central facility to send assistance. The changing of a truck tire while on the road, by one with experience, requires approximately 20-40 minutes. Tire sales and service companies, having automated equipment, experience truck tire changing at the rate of approximately three per hour. A medium sized tire service company may change forty to fifty truck tires per day requiring sufficient staff for such labor. U.S. Pat. No. 4,884,611 to Schmidt discloses a tire changing machine; U.S. Pat. No. 5,269,358 to Ling discloses a tire bead loosening tool and universal rim adapter; U.S. Pat. No. 5,876,526 Hamade et al discloses an automotive flat tire repair system improvement; U.S. Pat. No. 4,804,030 to Mandelko discloses a tire bead separator; U.S. Pat. No. 4,263,958 to Corless discloses a tire mounting, bead seating and inflation apparatus and method of use; U.S. Pat. No. 5,971,052 to Kliskey discloses a tire mount/dismount bar; U.S. Pat. No. 5,421,392 to Unrau discloses a tire bead breaker; U.S. Pat. No. 5,009,257 to Reeves discloses a tire breaker apparatus for all-terrain vehicle tires; U.S. Pat. No. 4,947,918 to Unrau discloses a tire changer; U.S. Pat. No. 4,641,699 to Giles et al discloses a tire bead breaking device; U.S. Pat. No. 4,415,014 to Turpin discloses a bead breaking tool; U.S. Pat. No. 4,848,731 to Ringo discloses a tire casing spreader; U.S. Pat. No. 5,649,582 discloses a bead breaking apparatus; U.S. Pat. No. 3,867,975 to Johnson discloses a tire changing tool; U.S. Pat. No. 4,787,433 to Thomas discloses a bead breaking device for tractor tires. The present invention is an improvement over this applicant's prior U.S. Pat. No. 6,536,501.

The foregoing patents and printed publications are provided herewith in an Information Disclosure Statement in accordance with 37 CFR 1.97.

SUMMARY OF THE INVENTION

Changing a tire requires the damaged or worn tire to be removed from a wheel and a replacement tire mounted on the wheel. A tire bead breaker apparatus, a tire mount/dismount apparatus and a bead rolling tool is disclosed.

The first act required to change a tire requires the tire bead, at both sides of the tire, to be disengaged from both sides of the wheel rim. A tire bead breaker module (110) is disclosed comprised of at least two elongated pressure clamps (2000) terminating in bead pad clamps (3300). The at least two elongated pressure clamps (2000) straddle a tire at the tire perimeter, positioning the at least two bead pad clamps (3300) proximal the tire rim and tire side proximal the tire bead. The pressure clamps (2000) are urged toward each other thus applying pressure to the tire at both sides and moving the tire side at the bead to disengage the bead from the tire rim. The pressure clamps (2000), having clamp first ends (2100) and clamp second ends (2200), are pivotally mounted on a generally "U" shaped mounting bar (1000). The mounting bar (1000) having a bar first end (1500) and a bar second end (1600). Pivot means pivotally interconnecting at least one pivot point (1400) proximal the bar first end (1500) and at least one pivot point (1400) proximal the bar second end (1600). The bead pad clamps (3300) are urged toward the opposing bead pad clamp (3300) by a hydraulic, pneumatic or screw driven actuator (4000), and, in the preferred embodiment, by a screw or thread driven actuator (4000), hydraulic actuator positioned between and attached to the at least two elongated pressure clamps (2000) proximal the respective clamp second ends (2200).

When the first tire bead (8) is freed from the tire rim (7) the actuator (4000) is reversed to urge the bead pad clamps (3300) away from the opposing bead pad clamp (3300). A sidewall stabilizer (3000) is slidably positioned intermediate the clamp first end (2100) and the clamp second end (2200) and, in the retracted position and on the tire side (9) where the tire bead (8) is freed from the rim (7), is extended toward and past the clamp first end (2100) and past the bead pad clamp (3300) to contact the rim (7). The actuator (4000) is again operated to urge the bead pad clamps (3300) toward each other. The sidewall stabilizer (3000) will encounter the rim (7) and stop movement of the bead pad clamp (3300) on the tire side (9) where the bead (8) is freed from the rim (7) and will cause the opposing bead pad clamp (3300) to exert force against the opposing bead (8) causing the opposing bead (8) to break free of the tire rim (7).

The Tire Mount/Dismount Module (60) is summarized as follows: a first element is a base plate assembly (8000), which is affixed to a wheel (4) so as to be immovable relative to the wheel (4); a second element is a receiver and drive assembly (7100), which is rotatably affixed to the base plate assembly (8000) and which has drive means to cause rotation of the receiver and drive assembly (7100) relative to the base plate assembly (8000); a third element is a receiver (7200) which receives or which comprises a bead rolling tool (9500); the bead rolling tool (9500) is fixedly received between a wheel (4) and a tire bead (8); the bead rolling tool (9500) turns as the receiver and drive assembly (7100) is rotated thus disengaging the bead (8) from the wheel (4) or re-engaging the tire (6) to the wheel when installing a tire. Upon disengagement of the bead (8) from the rim (7), a tire mount/dismount module (60) is employed as disclosed here.

The Bead Rolling Tool (9500) is summarized as follows: the bead rolling tool (9500) has a bead rolling tool slot (9560) which is received by a receiver (7200) and operates to remove and mount a tire on a wheel. A bead rolling tool first end slot bearing (9640) and a bead rolling tool second end slot bearing (9660) reduces friction and the likelihood of rim (7) damage during removal and mounting operations.

BRIEF DESCRIPTION OF THE DRAWINGS

The foregoing and other features and advantages of the present disclosure will become more readily appreciated as the same become better understood by reference to the following detailed description of the preferred embodiment and additional embodiments of the disclosure when taken in conjunction with the accompanying drawings, wherein:

FIGS. 14, 15, 16 and 17 illustrates the rim securing flange (8100) showing the rim securing flange first end (8110), rim securing flange first end right end (8111), right end width (8112), rim securing flange first end middle (8115), middle width (8116), rim securing flange first end left end (8117), left end width (8118) and rim securing flange first end rim mating surface (8119). Also seen is the rim securing flange second end (8120), rim securing flange top (8130), rim securing flange bottom (8140), tensioning slot flange (8150), slot flange top (8155) and tensioning slot flange bearing (8160).

FIG. 18 shows the stationary ring gear (9200) having stationary ring gear periphery (9230), stationary ring gear teeth (9235), stationary ring gear inner periphery (9240), inner periphery detent (9245), a stationary ring gear top side (9250) and a stationary ring gear bottom (9260).

FIG. 19 illustrates the drive gear (7112).

FIGS. 21, 22, 23 and 24 show the receiver (7200), receiver top (7205), receiver hub (7207), receiver first end (7210), receiver second end (7220), receiver center (7228), receiver center aperture (7230), receiver arm (7238), bead rolling tool receiver (7240), receiver retaining pin aperture (7241), receiver retaining pin (7242), bead rolling tool stop (7245).

FIG. 21A shows the bead rolling tool receiver (7240) as a casting of one piece illustrating the receiver slot (7246).

FIGS. 26 and 26 are top and bottom perspective views of the bead rolling tool (9500).

FIGS. 35, 36, 37 38, 39, 40, 41, 42 and 43 are illustrations of the bearing structures for the bead rolling tool (9500).

DETAILED DESCRIPTION

Figure 1:
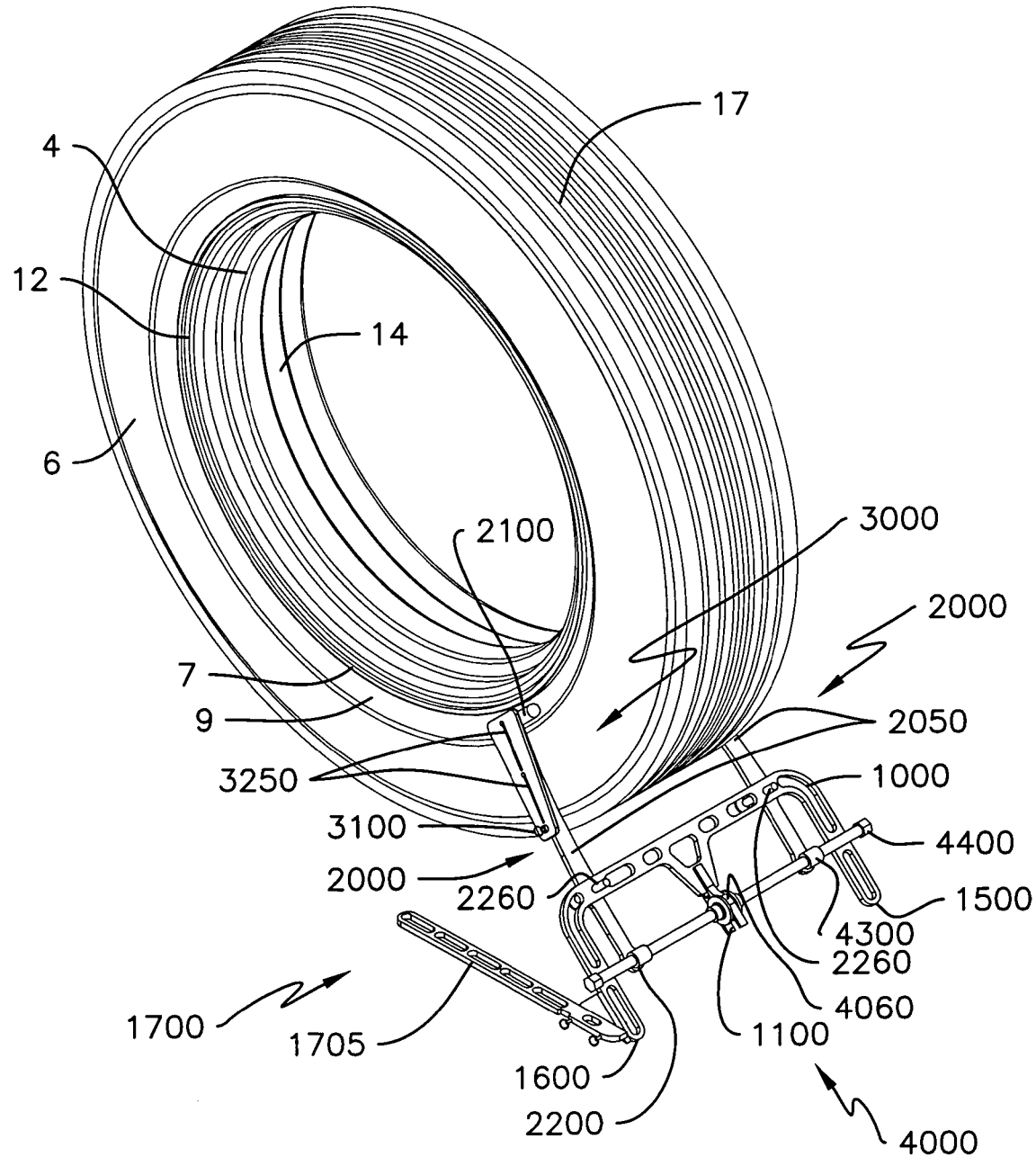
FIG. 1 is a perspective view of the tire bead breaker module (110) illustrating the mounting bar (1000), mounting bar first and second ends (1500) and (1600), pressure clamps (2000) and actuator (4000).
Figure 2:
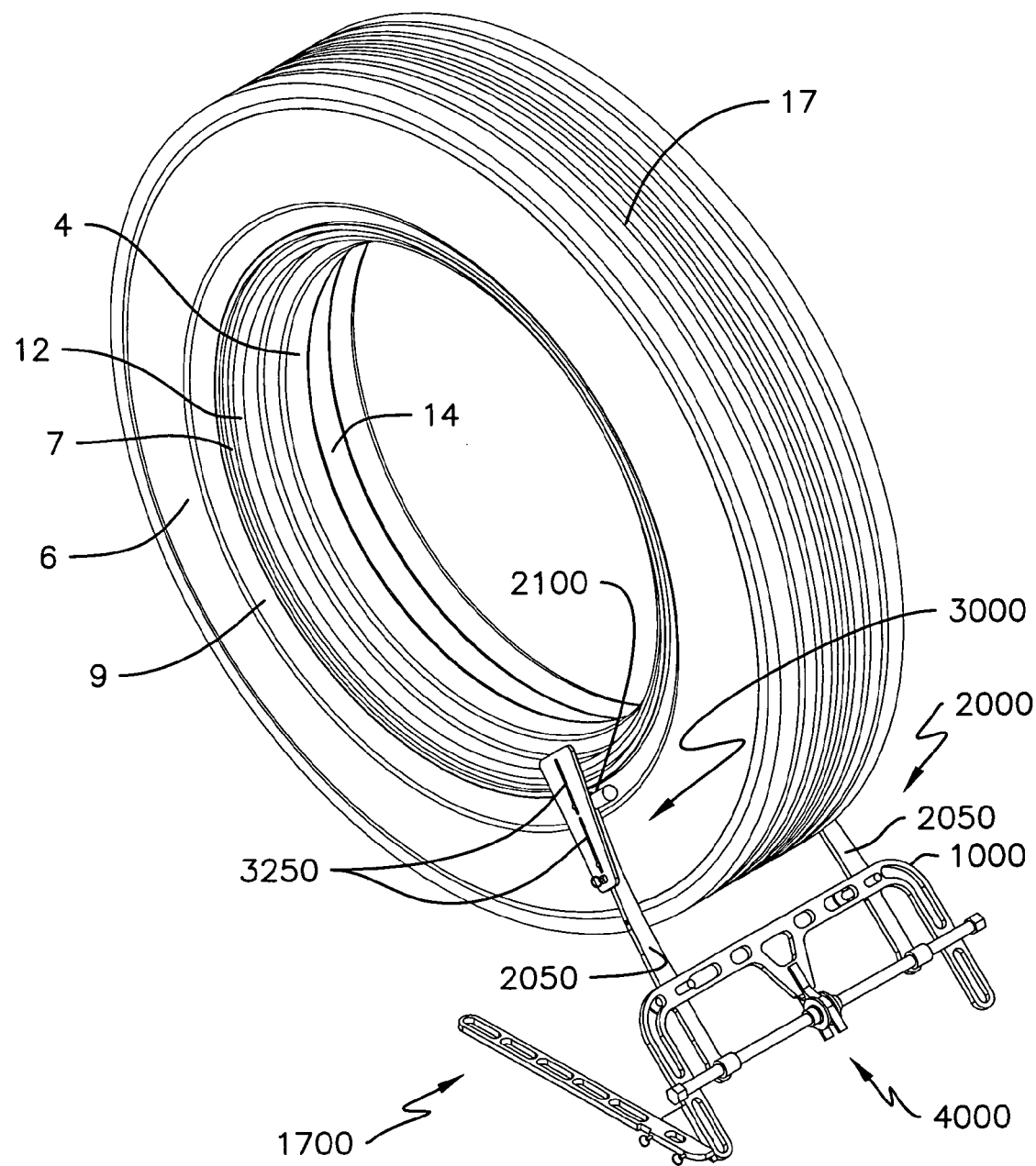
FIG. 2 is a perspective view of the tire bead breaker module illustrating the sidewall stabilizer (3000) extended to contact the rim (7) when the remaining pressure clamp (2000) exerts force on the bead.
Figure 2A:
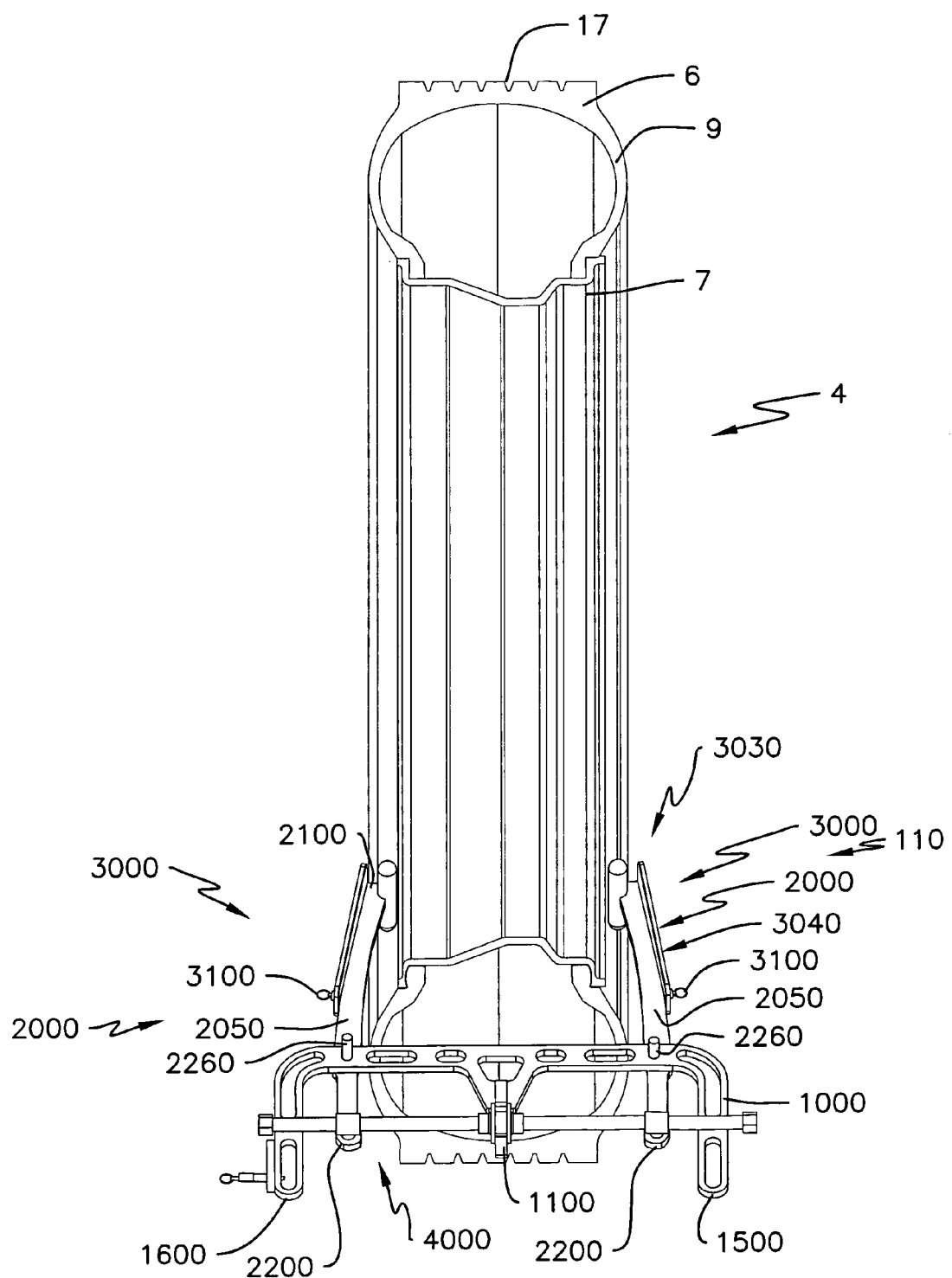
FIG. 2A is an elevation section view showing the tire bead (8).
Figure 3:
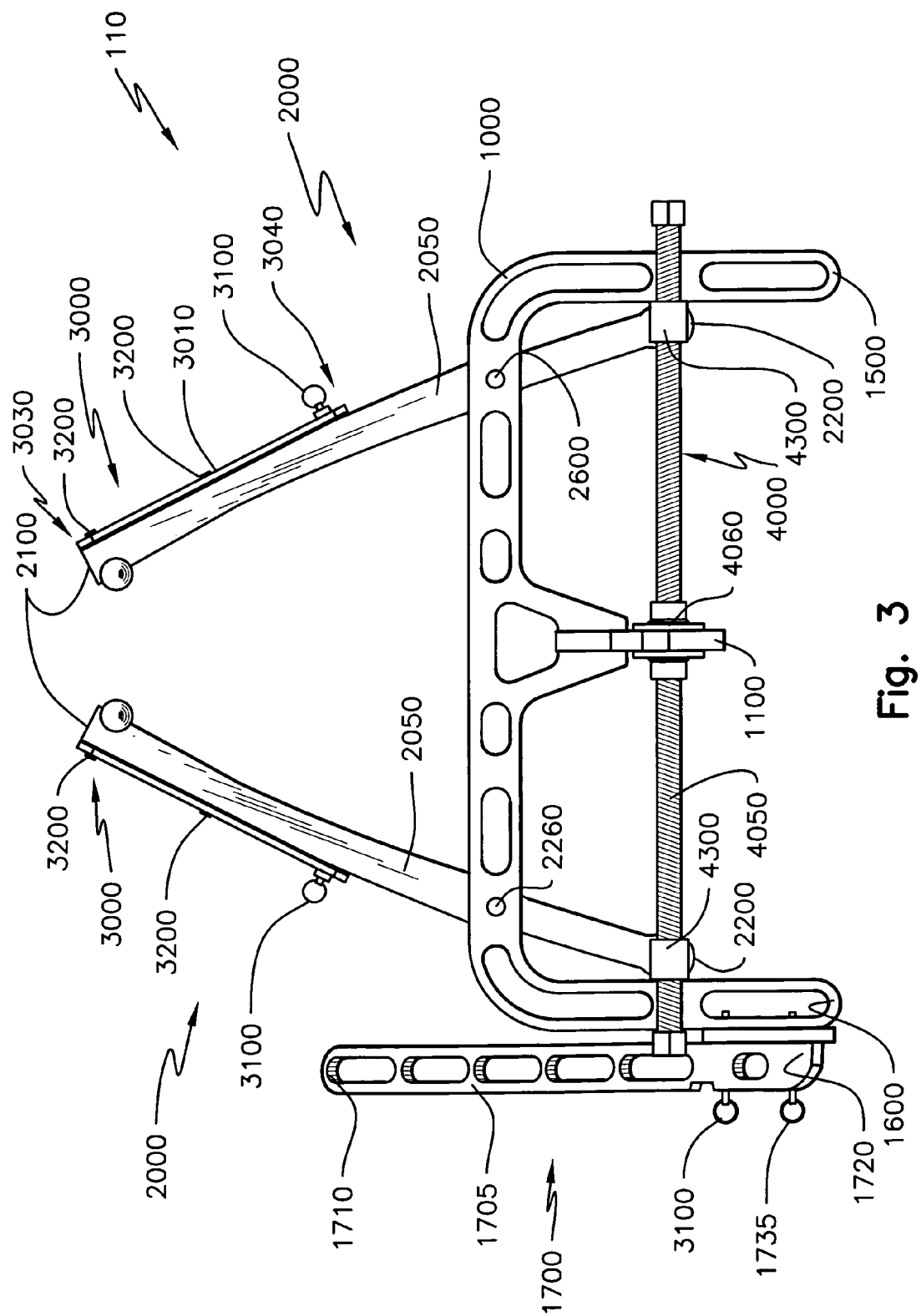
FIGS. 3, 4, 5 and 6 are front elevation, top plan, side elevation and exploded views of the bread breaker module.
Figure 4:
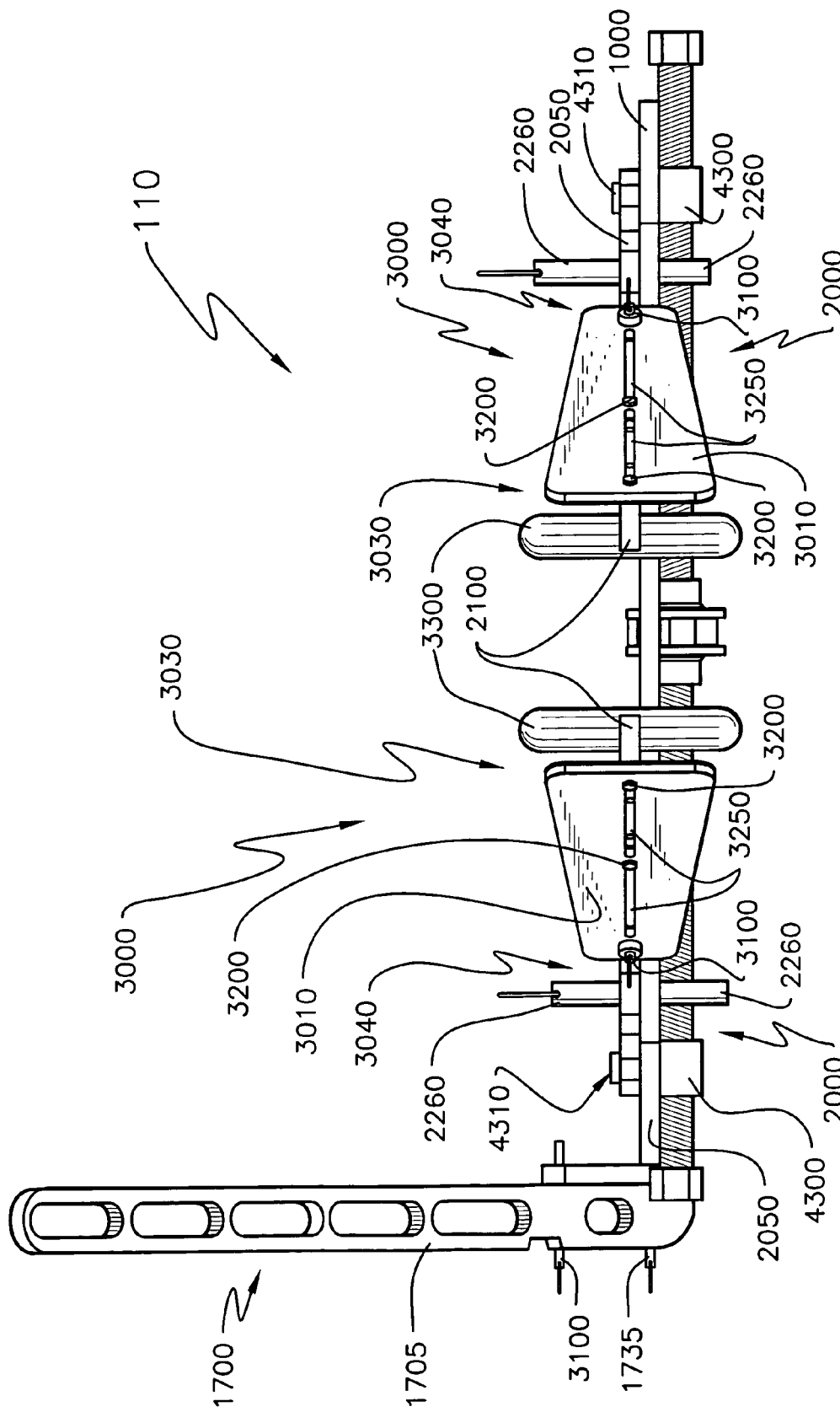
Figure 5:
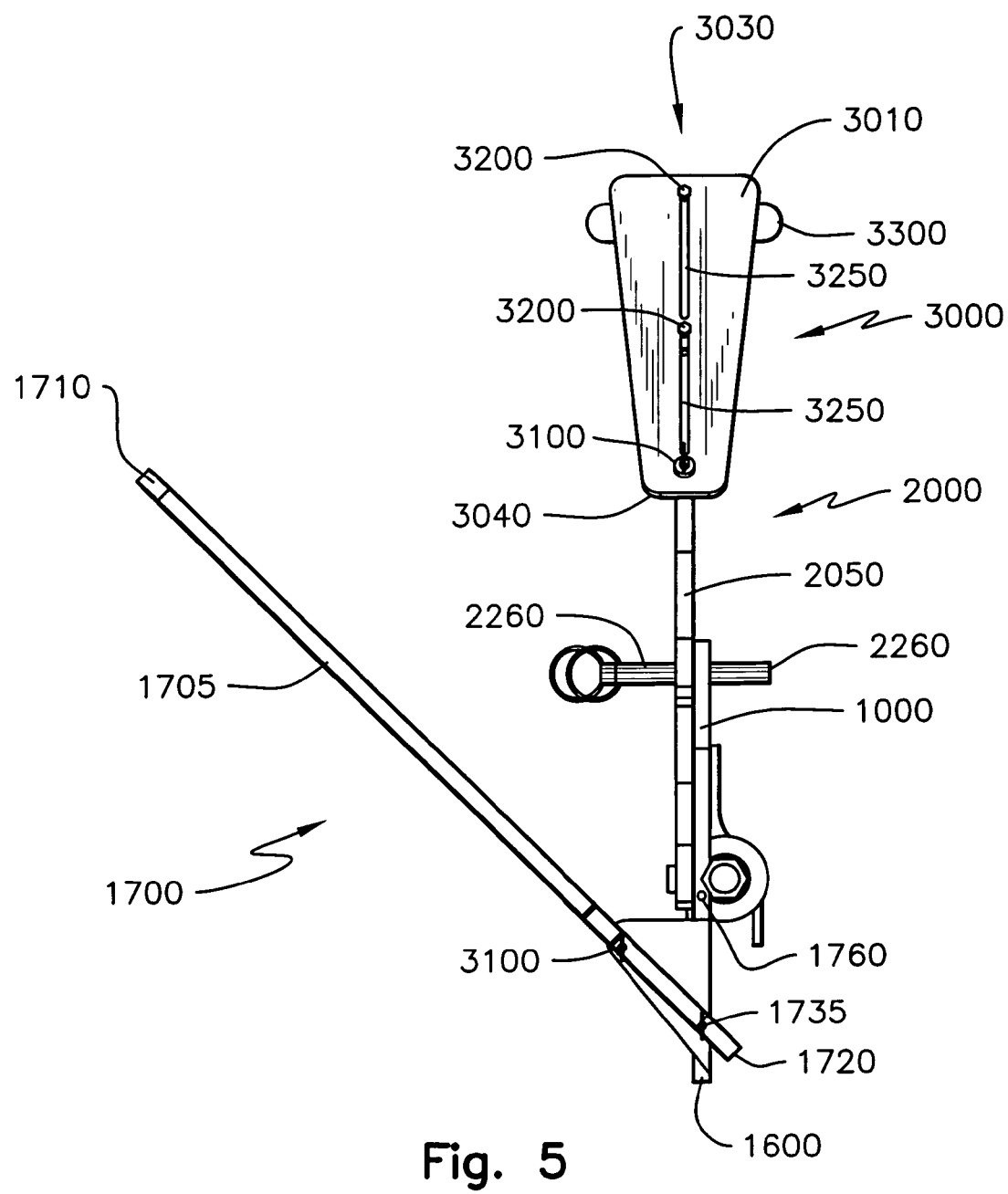

BEAD BREAKER APPARATUS: The tire changing and bead breaker apparatus comprises a tire bead breaker module (110), illustrated at FIGS. 1 through 6, having bead breaking means to apply pressure to the both sides of a tire (6) having sides (9) and tire beads (8); the bead breaking means causing the tire bead (8) at each side of the tire (6) to disengage from the rim (7) of a wheel (4). In the preferred embodiment the bead breaking means is comprised of at least two pressure clamps (2000); each at least two pressure clamps (2000) having a clamp first end (2100) and clamp second end (2200); the at least two pressure clamps (2000) positioned such that the respective clamp first ends (2100) are proximal the respective tire side (9); each at least two pressure clamps (2000) having a force means to urge the respective clamp first end (2100) against the respective tire side (9). In the preferred embodiment a bead pad clamp (3300) is rigidly affixed by bead pad clamp affixing means proximal the respective clamp first ends (2100); the bead pad clamp (3300) is generally elongated and sized and oriented, in its attachment proximal the respective clamp first end, to be received at the tire (6) side (9) generally parallel with the rim (7) and tire sides (9). The bead pad clamp (3300) will generally have a flat to convex surface which contacts the tire side (9). Bead pad clamp affixing means are general mechanical interconnection means including welding, bolt/nut, screw, rivet and molding. It will be appreciated that the bead pad clamp (3300) may be cylindrical with a circular or elliptical cross-section with a convex surface facing the tire side (9). It will be appreciated that the bead pad clamp (3300) may be semi-circular or semi-elliptical in cross-section so long as a convex surface faces the tire side (9). The bead pad clamp (3300) may, as well, have dimensions and shape which will be appreciated by those of ordinary skill in the tire arts such that sharp edges will not contact a tire side or sidewall which may damage the tire side (9) as force is exerted against the tire side (9).

In the preferred embodiment each of the at least two pressure clamps (2000) will be comprised of an elongated member (2050) generally composing a shaft, tube, rod or bar. The at least two pressure clamps (2000) will be composed of a material having sufficient structural integrity as to allow forces great enough to disengage the tire bead from the wheel rim and will thus likely be formed of metal. However, other materials may be utilized including composite materials, including Carbon Fibre and Carbon-Carbon Composites, woods, laminated structures and other material recognized by those of ordinary skill in the art. In the preferred embodiment the at least two pressure clamps (2000) have clamp first ends (2100) and claim second ends (2200) with the bead pad clamp (3300) positioned proximal each of the clamp first ends (2100).

Figure 6:
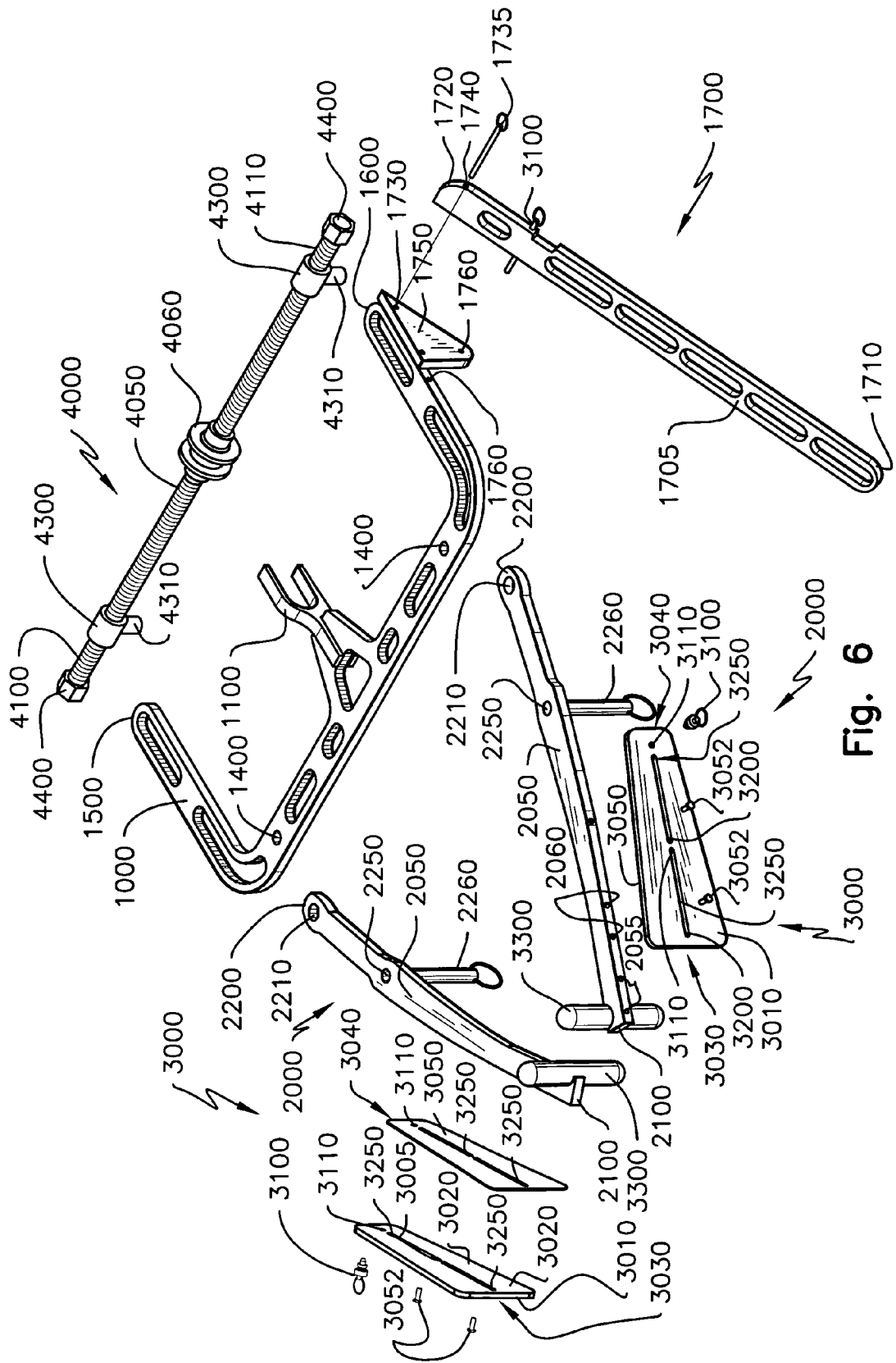

A sidewall stabilizer (3000) is movably and removably affixed to the elongated member (2050) proximal to the clamp first end (2100) and bead pad clamp (3300) extending downwardly toward clamp second end (2200). The sidewall stabilizer (3000) is planar and extends outwardly and generally orthogonal to the movement of the at least two pressure clamps (2000). The sidewall stabilizer (3000) has a stabilizer first part (3005), a stabilizer first side (3010), a stabilizer second side (3020), a stabilizer top (3030), a stabilizer bottom (3040) and at least one stabilizer slot (3250) from the stabilizer first side (3010) to the stabilizer second side (3020). The stabilizer first part (3005) is composed of rigid materials generally metals. A stabilizer rim protector (3050), composed generally of materials not likely to damage a wheel rim (7) including, in the preferred embodiment, plastics, is formed to the same shape, including apertures and slots, as the stabilizer first part (3005) and is affixed, by stabilizer rim protector affixing means, to the stabilizer first part (3005) at the stabilizer bottom (3040). Rim protector affixing means includes at least one rim protector rivet (3052), other mechanical equivalents and adhesives as illustrated in FIG. 6. The stabilizer rim protector (3050) fulfills the function of bearing against the wheel rim (7) for the purpose of reducing the likelihood of damaging or scarring the rim (7).

The at least one stabilizer slot (3250), formed both in the sidewall stabilizer (3000) and the stabilizer rim protector (3050), is oriented, when the sidewall stabilizer (3000) is movably and removably affixed to the elongated member (2050), parallel to the elongated member (2050), intermediate the stabilizer top (3030) and the stabilizer bottom (3040). In the preferred embodiment at least one bolt (3200) is received through the at least one stabilizer slot (3250), the bolt (3200) having threads received by the elongated member (2050) by at least one threaded slot bolt aperture (2055) having threads. The bolt (3250) head being wider than the at least one stabilizer slot (3250) thereby retaining the sidewall stabilizer (3000) proximal the elongated member (2050). In the preferred embodiment there are at least two stabilizer slots (3250), each receiving a bolt (3250) having a head wider than the at least two stabilizer slots (3250) thereby retaining the sidewall stabilizer (3000) proximal the elongated member (2050).

Each of said bolts (3200) having threads received by the elongated member (2050) by at least one threaded slot bolt aperture (2055) having threads.

The sidewall stabilizer (3000) is movable relative to the elongated member (2050). The sidewall stabilizer (3000) is retained in at least one position relative to the elongated member by at least one handle and pin (3100) wherein pin means is received through at least one pin aperture (3110) where said at least one pin aperture (3110) extends from the stabilizer first side (3010) to the stabilizer second side (3020) and through the stabilizer rim protector (3050). Said at least one pin aperture (3110) is aligned with at least one elongated member pin aperture (2060) formed in the elongated member (2050). The at least one handle and pin (3100) is, in the preferred embodiment, a spring plunger detent which is spring urged from the stabilizer first side (3010) toward and into the at least one elongated member pin aperture (2060).

The at least one handle and pin (3100) is retained by a collar relative to the sidewall stabilizer (3000) and, for movement of the sidewall stabilizer (3000) is withdrawn by pulling the handle outwardly from the sidewall stabilizer (3000) thus withdrawing the pin from the at least one elongated member pin aperture (2060) thereby allowing the sidewall stabilizer (3000) to be slidably moved toward the clamp first end (2100) or toward the clamp second end (2200). Upon slidable movement of the sidewall stabilizer (3000) to the desired position the handle of the handle and pin (3100) is released thereby allowing the spring plunger detent to insert the pin of the handle and pin (3100) into one of the at least one elongated member pin apertures (2060) in the preferred embodiment there are at least two elongated member pin apertures (2060).

Generally one tire bead (8) will break from the rim (7) prior to the other tire bead (8). When the first tire bead (8) is freed from the tire rim (7) the actuator (4000) is reversed to urge the bead pad clamps (3300) away from the opposing bead pad clamp (3300). The sidewall stabilizer (3000), being slidably positioned intermediate the clamp first end (2100) and the clamp second end (2200) and, in the retracted position and on the tire side (9) where the tire bead (8) is freed from the rim (7), is extended toward and past the clamp first end (2100) and past the bead pad clamp (3300). The sidewall stabilizer (3000) is slidably positioned intermediate the clamp first end (2100) and the clamp second end (2200). With the bead pad clamps in the retracted position the sidewall stabilizer (3000), on the tire side (9) where the tire bead (8) is freed from the rim (7), is extended, using a handle and pin means (3100) toward and past the clamp first end (2100) and past the bead pad clamp (3300). The sidewall stabilizer (3000) functions to stop movement of the bead pad clamp (3300) and to reduce potentially damaging forces, particularly where the wheel is composed of aluminum, imparted by the bead breaker module (110) against the wheel rim (7).

The actuator (4000) is again operated to urge the bead pad clamps (3300) toward each other. The sidewall stabilizer (3000), extending beyond the bead pad clamp (3300) will encounter the rim (7) and stop movement of the bead pad clamp (3300) on the tire side (9) where the bead (8) is freed from the rim (7) and will cause the opposing bead pad clamp (3300) to exert force against the opposing bead (8) causing the opposing bead (8) to break free of the tire rim (7).

It will be seen for the preferred embodiment, that the elongated member (2050) is of a length such that the at least two pressure clamps (2000) will straddle a tire (6) at the tire perimeter (17) such that the elongated member (2050) extends the clamp first ends (2100) toward and proximal the tire side (9) for proper placement of the bead pad clamp (3300) proximal the tire side (9). Thus at the perimeter (17) the mounting bar (1000), clamp second ends (2200) and actuator (4000) will be proximal the tire perimeter (17).

The at least two pressure clamps (2000) are, in the preferred embodiment, mounted on a mounting bar (1000) having a mounting bar first end (1500) and mounting bar second end (1600); the at least two pressure clamps (2000) are pivotally affixed by pivotally affixing means, intermediate the said clamp first ends (2100) and claim second ends (2200), to the mounting bar (1000) such that one of said at least two pressure clamps (2000) is proximal the mounting bar first end (1500) and that one of said at least two pressure clamps (2000) is intermediate the pivotally affixed pressure clamp (2000) proximal the mounting bar first end (1500) and the mounting bar second end (1600); the at least two pressure clamps (2000) pivotally affixed such that the respective clamp first ends (2100) oppose each other and the respective clamp second ends (2200) oppose each other; force means (4000) composed of an actuator (4000) having means of extension and retraction is affixed proximal the clamp second ends (2200) such that actuation of said actuator (4000) causes the respective at least two pressure clamps (2000) to pivot. Actuation of said actuator (4000) causes the respective at least two pressure clamps (2000) to pivot such that the clamp first ends (2100) move toward each other in extension and away from each other in retraction.

In the preferred embodiment the mounting bar (1000) has at least one mounting bar pivot aperture (1400) proximal the mounting bar first end (1500) and at least one mounting bar pivot aperture (1400) proximal the mounting bar second end (1600). Each of the elongated members (2050) having a second pivot aperture (2250) or bushing. The second pivot aperture (2250) and the respective mounting bar pivot aperture (1400) oriented and sized to receive pivot fixing means (2260) comprised of rotatable bolt and nut or shaft and pin means.

Those of ordinary skill in the actuator arts will appreciate that a variety of electric, hydraulic, pneumatic, screw or thread and other actuators (4000) providing movement by cylinder and piston, solenoid and shaft, gear means, screw and or thread means and other means are available for attachment to and providing force to cause the respective at least two pressure clamps (2000) to pivot and to move toward and away from the other at the clamp first ends (2100).

In the preferred embodiment the actuator (4000) is elongated and composed of rigid tubular or rod stock providing a actuator shaft (4050) having a screw and or thread means. The actuator shaft (4050) has an actuator first end (4100) and a actuator second end (4110) with the actuator shaft (4050) being threaded from the actuator first end (4100) toward the actuator second end (4110) to a point intermediate the actuator first end (4100) and the actuator second end (4110). In the preferred embodiment a nut (4400) is rigidly affixed by nut affixing means at the actuator first end (4100) and at the actuator second end (4110). The actuator shaft (4050) being reverse threaded from the actuator second end (4110) toward the actuator first end (4100). A threaded cylindrical collar (4300) received by threads of the actuator (4000) proximal the actuator first end (4100) and a reverse threaded cylindrical collar (4300) received by the actuator proximal the actuator second end (4110). A pin (4310) rigidly affixed by pin affixing means including welding, machining and other means known to those of the mechanical arts, to and extending from each cylindrical collar (4300) generally orthogonal to the actuator (4000). Each of the elongated members (2050) having a first pivot aperture (2210) or bushing proximal the clamp second end (2200) oriented and sized to rotatably receive the pin (4310) extending from the respective collar (4300). The pin (4310) secured by pin securing means from disengaging from the respective pivot aperture (2210).

As the actuator (4000) causes the elongated members (2050) to move the claim second ends (2200) will ascribe an arc thus moving the actuator shaft (4050) upward and downward relative to the mounting bar (1000). An actuator shaft yoke neck (4060) is affixed intermediate the actuator first end (4100) and the actuator second end (4110). The actuator shaft yoke neck (4060), in the preferred embodiment, is formed as a pulley shape or has a "V" shaped cross-section. A mounting bar yoke (1100), intermediate the mounting bar first end (1500) and the mounting bar second end (1600) downwardly extends such that the mounting bar yoke (1100) is received by the actuator shaft yoke neck (4060) allowing the actuator shaft yoke neck (4060) to move upwardly and downwardly.

A mounting bar support (1700) which supports the tire bead breaker module (110) when the tire bead breaker module (110) is used. At least one mounting bar support bar (1705), which in the preferred embodiment is elongated, has a mounting bar support first end (1710) and a mounting bar support second end (1720). The mounting bar support bar (1705) is pivotally mounted to the tire bead breaker module (110) proximal the mounting bar first end (1500) or the mounting bar second end (1600) via a mounting bar pivot bolt (1735) rotatably received by a mounting bar support aperture (1740) in the mounting bar support bar (1705) which is aligned with a mounting bar pivot support aperture (1730). The mounting bar pivot support aperture (1730) is formed in a mounting bar support frame (1750) comprised, in the preferred embodiment, of a triangular frame proximal the mount bar first end (1500) or the mounting bar second end (1600). At least one mounting bar support frame detent aperture (1760) formed in the mounting bar support frame (1750) and or the mounting bar frame (1000) to receive the pin of a handle and pin (3100). When in use the handle and pin (3100) will be released to allow the mounting bar support bar (1705) to extend outwardly from the mounting bar frame (1000), be secured generally at an acute angle to the mounting bar frame (1000) and provide a secure member to retain the tire bead breaker module (110) in a stable position as the actuator (4000) is operated. Upon completion of use of the tire bead breaker module (110) the handle and pin (3100) is released, the mounting bar support bar (1705) is returned to a position upright and parallel to the mounting bar frame (1000) with the pin of the handle and pin (3100) received into at least one mounting bar support aperture (1740).

It will be recognized that the actuator (4000) may be positioned in other locations such as between the at least two elongated members (2050) intermediate the clamp first ends (2100) and the mounting bar (1000) and mounting bar pivot aperture (1400). In alternative embodiments the actuator may be pneumatic, hydraulic or solenoid piston and shaft configuration. Additionally, it will be seen that one or more actuators may be utilized providing, e.g., for an actuator (4000) proximal each clamp first end (2100) which urges force to extend or retract a bead bad clamp (3300) toward or away from a tire side (9).

The sidewall stabilizer (3000) has a handle and pin means (3100) which allows extension and retraction of a pin of the handle and pin means (3100). The handle and pin means (3100) is such that the pin of the handle and pin means (3100) is received into at least one elongated member pin aperture (2060) at the elongated member (2050) thereby retaining the sidewall stabilizer (3000) in a fixed position relative to the elongated member (2050) when the pin of the handle and pin means (3100) is extended. A handle of the handle and pin means (3100) extends outwardly from the sidewall stabilizer (3000) and the tire side (9) and functions as a handle to move the sidewall stabilizer (3000) relative to the elongated member (2050). The handle and pin means (3100), in the preferred embodiment, is formed by a handle and pin (3100) which is affixed by handle and pin affixing means at a pin aperture (3110) formed from the stabilizer first side (3010) to the stabilizer second side (3020). The handle and pin (3100) is spring urged toward the elongated member (2050) for the extension of the pin of the handle and pin (3100) into the at least one elongated member pin aperture (2060). Outwardly exerted force on the handle and pin (3100), generally by grasping and pulling outwardly the handle of the handle and pin (3100) will, in the preferred embodiment, retract the pin of the handle and pin (3100) from the at least one elongated member pin aperture (2060). With the pin of the handle and pin (3100) retracted force on the handle of the handle and pin (3100) toward the clamp first end (2100) will cause the sidewall stabilizer (3000) to move toward the clamp first end (2100) with the bolt (3200) bearingly received by the at least one stabilizer slot (3250) and the sidewall stabilizer (3000) retained proximal the elongated member (2050). At least one second elongated member pin aperture (2060) to receive the pin of the handle and pin (3100) when the sidewall stabilizer (3000) is moved toward and past the bead clamp (3300).

With the pin of the handle and pin (3100) retracted force on the handle of the handle and pin (3100) toward the clamp second end (2200) will cause the sidewall stabilizer (3000) to move toward the clamp second end (2200) with the bolt (3200) bearingly received by the at least one stabilizer slot (3250) and the sidewall stabilizer (3000) retained proximal the elongated member (2050) and distal to the bead clamp (3300).

Figure 7:
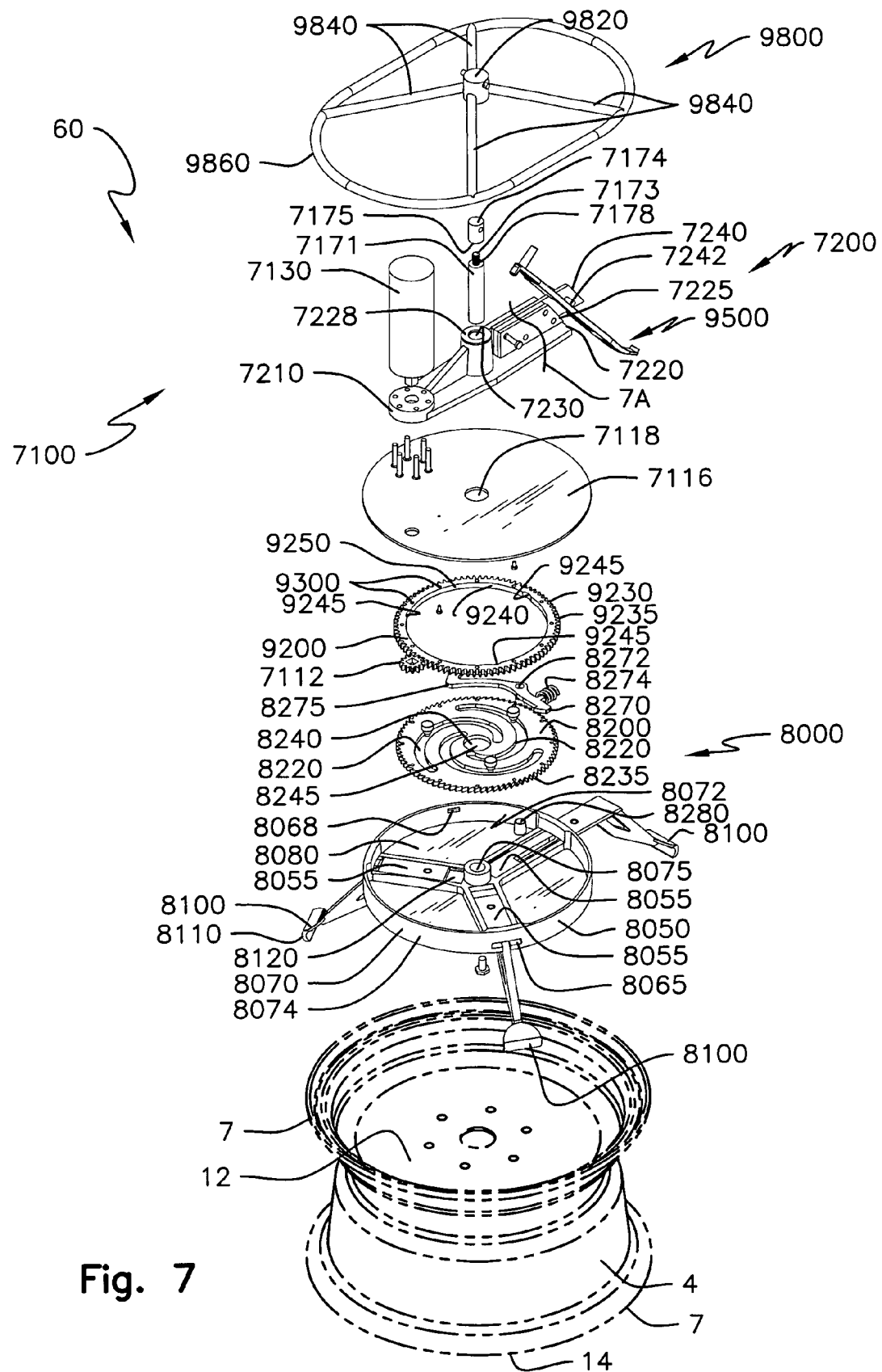
FIG. 7 is an exploded view of the tire mount/dismount module showing tire mount/dismount unit (7000), movable rotating drive means (7130), drive gear (7112), stationary rotating means (8200) as a stationary ring gear (8200), drive means (7130), safety cover (7116), safety cover center shaft aperture (7118), a center shaft (7171), center shaft top (7173), center shaft top lock (7174), center shaft top lock bearing surface (7175), center shaft bottom (7176), center shaft handle shaft (7178), center shaft aperture (7179), receiver (7200), receiver first end (7210), frame affixing means (7212). receiver second end (7220), receiver center (7228), receiver center aperture (7230), bead rolling tool receiver (7240), receiver retaining pin aperture (7241), receiver retaining pin (7242), bead rolling tool stop (7245), base plate assembly (8000), base plate assembly frame (8050), base plate assembly center aperture (8075), center aperture bottom (8077), center aperture bottom bolt hole (8079), planar base plate assembly bottom (8080), outer base plate assembly rim (8070), base plate rim inner surface (8072), base plate rim outer surface (8074), rim securing flange slots (8055), rim slot (8065), ratchet pawl aperture (8068), rim securing flange (8100), rim securing flange first end (8110), rim securing flange first end right end (8111), right end width (8112), rim securing flange first end middle (8115), middle width (8116), rim securing flange first end left end (8117), left end width (8118), rim securing flange first end rim mating surface (8119), rim securing flange second end (8120), rim securing flange top (8130), rim securing flange bottom (8140), tensioning slot flange (8150), slot flange top (8155), tensioning slot flange bearing (8160), ratchet gear ring (8200), ratchet gear periphery (8230), ratchet gear teeth (8235), ratchet gear center (8240), a ratchet gear top side (8250), a ratchet gear bottom (8260), ratchet gear slot (8220), ratchet pawl (8270), ratchet handle (8272), ratchet spring (8274), ratchet pawl release handle (8275), ratchet pawl pivot (8280), stationary ring gear (9200), stationary ring gear periphery (9230), stationary ring gear teeth (9235), stationary ring gear inner periphery (9240), inner periphery detent (9245), a stationary ring gear top side (9250), a stationary ring gear bottom (9260) and a bead rolling tool (9500).
Figure 7A:
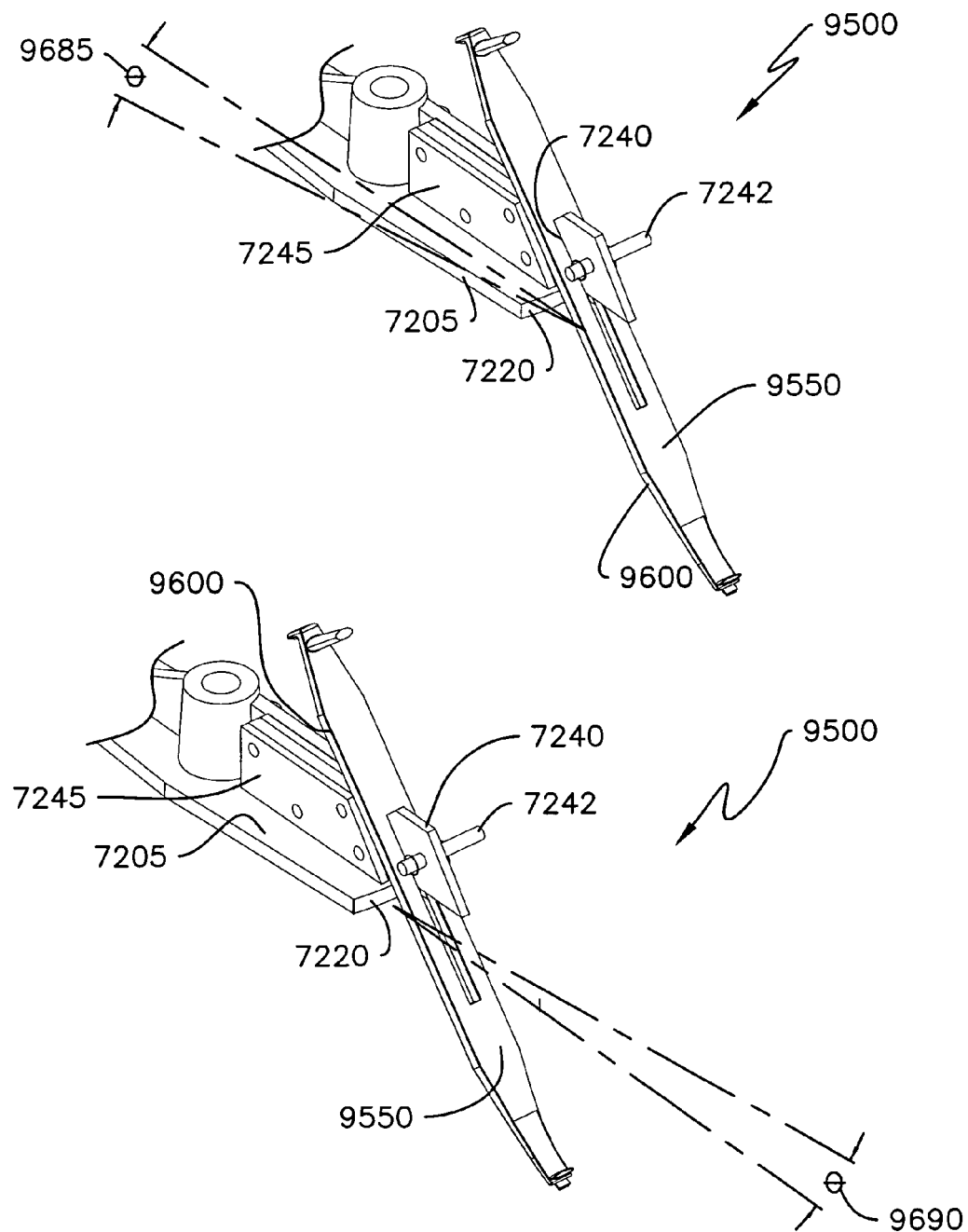
FIG. 7A illustrates the angular relationship of the bead rolling tool (9500) to the receiver (7240).

THE TIRE MOUNT/DISMOUNT MODULE: The structure of the Tire Mount/Dismount Module (60), shown at FIG. 7, is summarized as follows: a first element is a base plate assembly (8000), which is affixed to a wheel (4) so as to be immovable; a second element is a receiver and drive assembly (7100), which is rotatably affixed to the base plate assembly (8000) and which has drive means to cause rotation of the receiver and drive assembly (7100) relative to the base plate assembly (8000); a third element is a receiver (7200) which receives or which comprises a bead rolling tool (9500); the bead rolling tool (9500) is received between a wheel (4) and a tire bead (8); the bead rolling tool (9500) turns as the receiver and drive assembly (7100) is rotated thus disengaging the bead (8) from the wheel (4) or re-engaging the tire (6) to the wheel when installing a tire.

The base plate assembly (8000), seen at FIG. 7 to 9, 12 to 13 to 17, is comprised of a base plate assembly frame (8050) having a base plate assembly center aperture (8075). The base plate assembly (8000) has a planar base plate assembly bottom (8080) with an upstanding outer base plate assembly rim (8070). The outer base plate assembly rim (8070) having a base plate rim inner surface (8072) and a base plate rim outer surface (8074). At least two rim securing flange slots (8055) are equidistantly separated extending from proximal the base plate assembly center (8075) to the outer base plate assembly rim (8070). A rim slot (8065) through the base plate assembly rim (8070) from the base plate rim inner surface (8072) to the base plate rim outer surface (8074) is aligned with the at least two rim securing flange slots (8055).

The rim securing flange (8100), illustrated at FIGS. 7 to 9 and 14 to 16, is elongated having a rim securing flange first end (8110), a rim securing flange second end (8120), a rim securing flange top (8130), a rim securing flange bottom (8140) and a tensioning slot flange (8150). The tensioning slot flange (8150) extends upwardly from the rim securing flange top (8130), having a tensioning slot flange top (8155) most distal to the rim securing flange top (8130) and having a tensioning slot flange bearing (8160) intermediate the rim securing flange top (8130) and slot flange top (8155). The slot flange top (8155) is immovably affixed to the tensioning slot flange bearing (8160) distal to the rim securing flange top (8130) by flange affixing means including pins, threads, welding and other affixing means known to those of the mechanical arts.

Each of the rim slots (8065) and the at least two rim securing flange slots (8055) are sized to receive and guide a rim securing flange (8100) at a rim securing flange second end (8120). Each rim securing flange (8100) having a rim securing flange bottom (8140) which is slidably and bearingly received and guided by one of the at least two rim securing flange slots (8055).

Seen at FIGS. 7 to 9 and 18 to 20 is a rotating means comprised of a movable rotating drive (7112) rotatably interrelated to a stationary rotating means (9200) and the movable rotating drive (7112) is rotatably affixed to the receiver and drive assembly (7100). The movable rotating drive (7112) is, in the preferred embodiment, comprised of a drive gear (7112) rotatably interrelated to a stationary rotating gear (9200) comprised, in the preferred embodiment, of a stationary ring gear (9200) having gear teeth (9235) at a stationary ring gear periphery (9230), a stationary ring gear top side (9250) and a stationary ring gear bottom (9260). At least one stationary ring gear aperture (9300) is formed from the stationary ring gear top side (9250) to the stationary ring gear bottom (9260). The stationary ring gear (9200) has a stationary ring gear inner periphery (9240) having at least one inner periphery detent (9245). In the preferred embodiment at least one inner periphery detent (9245) for each of the at least one rim securing flange (8100).

Figure 8:
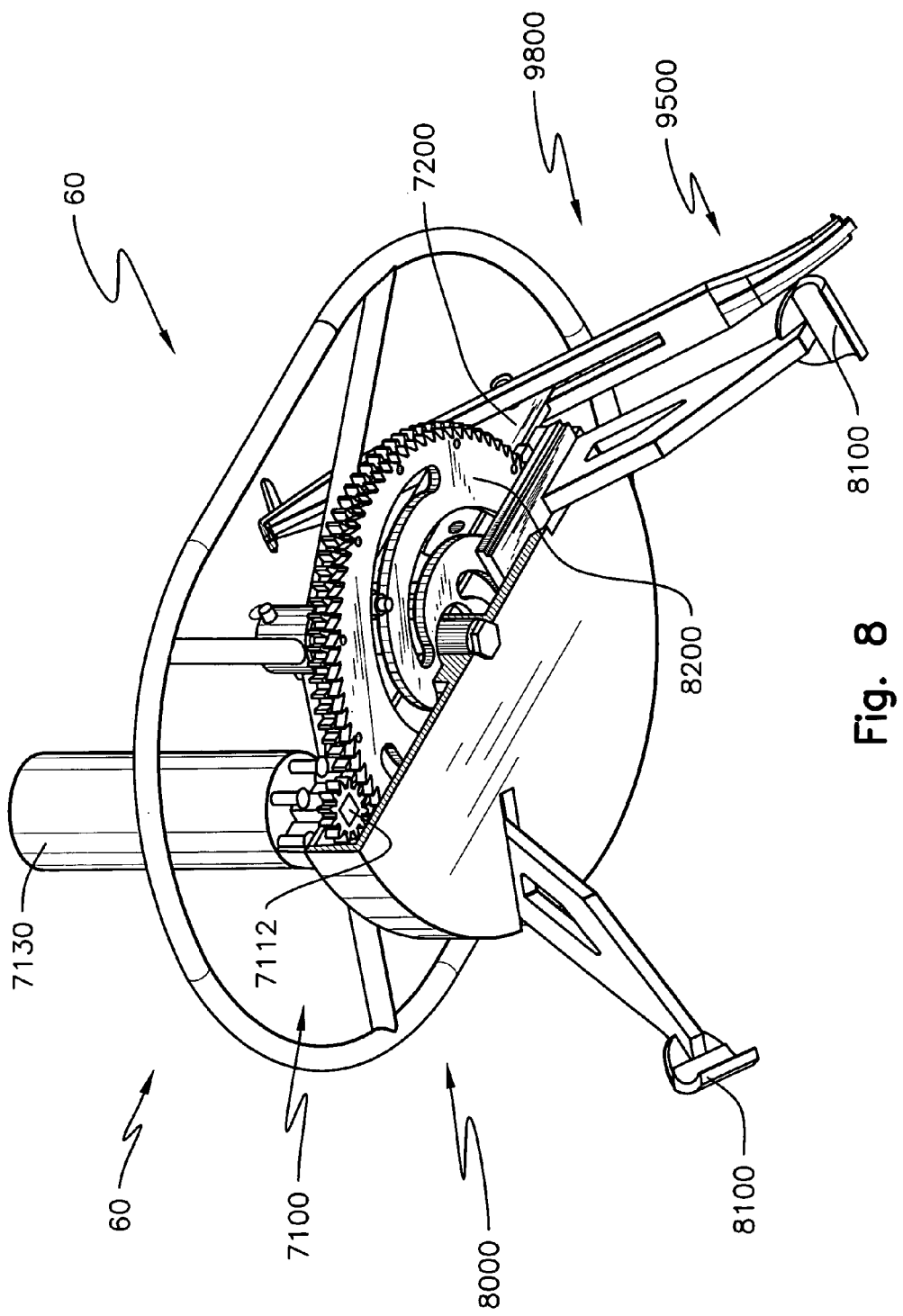
FIG. 8 is a bottom perspective view of the tire mount/dismount module.
Figure 9:
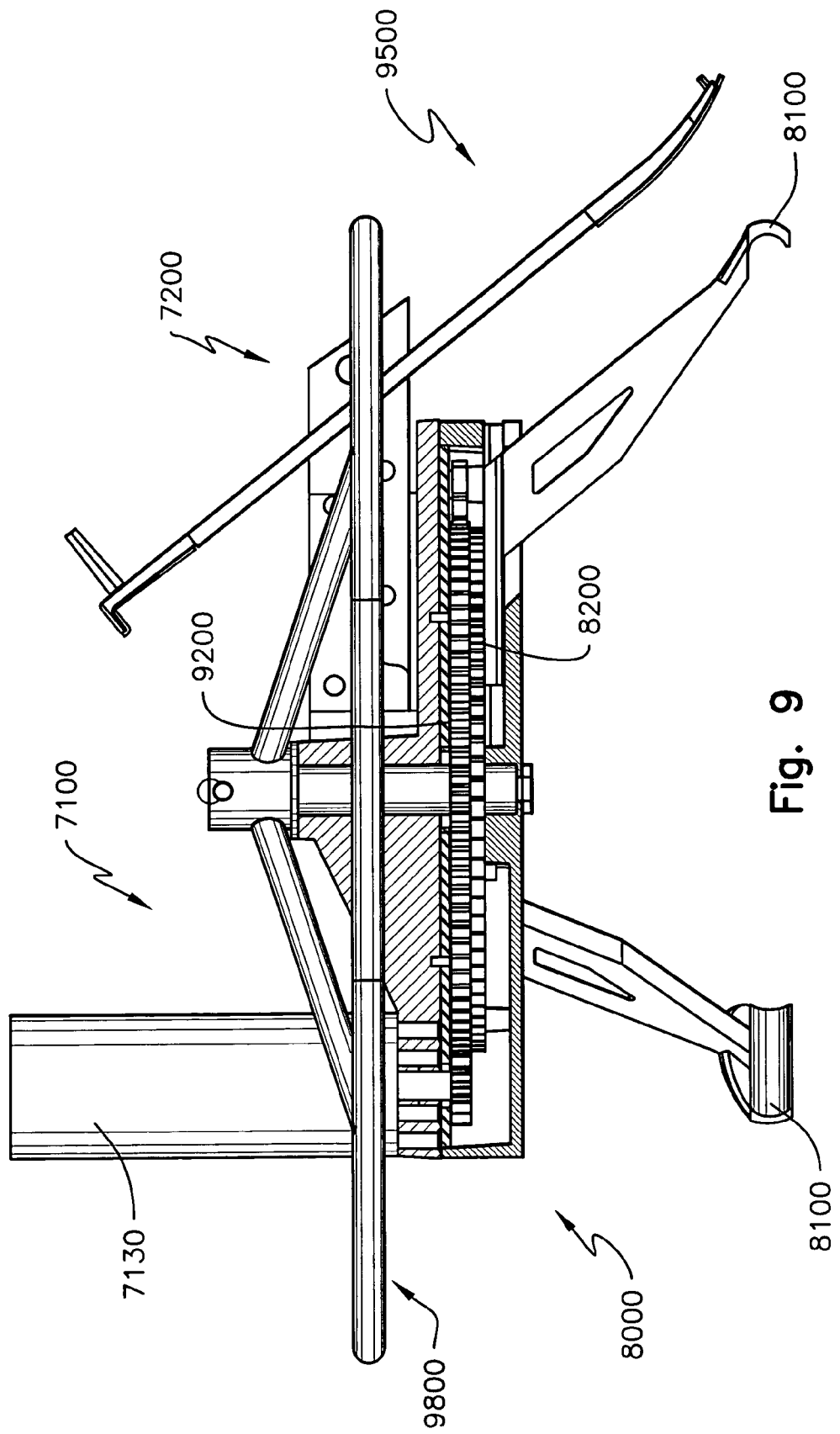
FIG. 9 is a side elevation view of the tire mount/dismount module.

In the preferred embodiment the movable rotating drive means (7112) is rotated by at least one drive means (7130) composed, for example, by an electric, hydraulic and or pneumatic motor (7130) seen at FIGS. 7 to 9, which rotates the drive gear (7112) which is in gear contact with the stationary ring gear (9200) thereby causing the drive means (7130), movable rotating drive means (7112) or drive gear (7112) to rotate relative to the stationary ring gear (9200). The receiver (7200) is affixed to a safety cover (7116) which is rotated as the drive gear (7112) is rotated. The Figures depict the drive means (7130) as extending from the safety cover (7116). Those of ordinary skill in the machine arts will appreciate that the structure of rotating one structure in relation to another may be accomplished by a variety of methods including, e.g., by a pulley and belt means, a ratchet means and by other methods. It will be appreciated that the at least one movable rotating drive means (7112) may be the equivalent of or provide an equivalent function as a ring gear (7112) which rotates while a drive gear or stationary rotating means (7112) remains stationary. Those of ordinary skill in the art will recognize that the rotating means including drive means (7130) may be positioned central to the Tire Mount/Dismount Module (60) with rotating drive means (7112) rotatably interrelated to a stationary rotating means (8200) structured such that the rotating drive means (7112) is a drive gear interrelated to a ring gear and, where desired, to a center shaft (7171) or constitutes other rotating means interrelated to gear means and or a center shaft (7171).

A ratchet gear (8200), seen at FIGS. 7 to 9 and 20, is planar having ratchet gear teeth (8235) at a ratchet gear periphery (8230), a ratchet gear center(8240), a ratchet gear center shaft aperture (8245) at the ratchet gear center (8240), a ratchet gear top side (8250), a ratchet gear bottom (8260) and at least one ratchet gear slot (8220) from the ratchet gear top (8250) to the ratchet gear bottom (8260) and extending from proximal the ratchet gear center (8240) to proximal the ratchet gear periphery (8230). At least one ratchet gear aperture (8300) is formed from the ratchet gear top side (8250) to the ratchet gear bottom (8260). The ratchet gear center shaft aperture (8245) rotatably receiving the center shaft (7171). An elongated ratchet handle (8272) having a ratchet pawl (8270) distal from a ratchet pawl release handle (8275).

The elongated ratchet handle (8272) is pivotally affixed by pawl affixing means at a ratchet pawl pivot (8280). In the preferred embodiment the ratchet pawl pivot (8280) is upstanding from the base plate assembly bottom (8080)

proximal the base plate assembly rim (8070). A ratchet pawl release handle (8275) extends through a ratchet pawl aperture (8068) at the base plate assembly rim (8070). In the preferred embodiment the ratchet pawl is spring urged against the ratchet gear teeth (8235) by a ratchet spring (8274). It will be appreciated that those of ordinary skill in mechanical arts will know that a ratchet spring (8274) may be positioned intermediate the ratchet pawl (8270) and the ratchet pawl pivot (8280) or distal from the ratchet pawl pivot (8280) and the ratchet pawl (8270) thereby pushing or pulling the elongated ratchet handle (8272) so as urge the ratchet pawl (8270) into ratchet gear contact with the ratchet gear teeth (8235).

In the preferred embodiment the ratchet gear (8200), as illustrated at FIGS. 7 to 9 and 20, is immovably affixed to the stationary ring gear (9200) by gear affixing means comprising bolts, screws, welding, formation by molding or machining. In the preferred embodiment the ratchet gear (8200) is immovebly affixed to the stationary ring gear (9200) by bolts received by the least one ratchet gear aperture (8300) aligned with the at least one stationary ring gear aperture (9300) such that the ratchet gear (8200) and the stationary ring gear (9200) are concentric and such that the ratchet gear bottom (8260) is proximal the stationary ring gear bottom (9260). In the preferred embodiment the at least one ratchet gear aperture (8300) comprises a plurality of ratchet gear apertures (8300), the at least one stationary ring gear aperture (9300) comprises a plurality of stationary ring gear apertures (9300).

Figure 20:
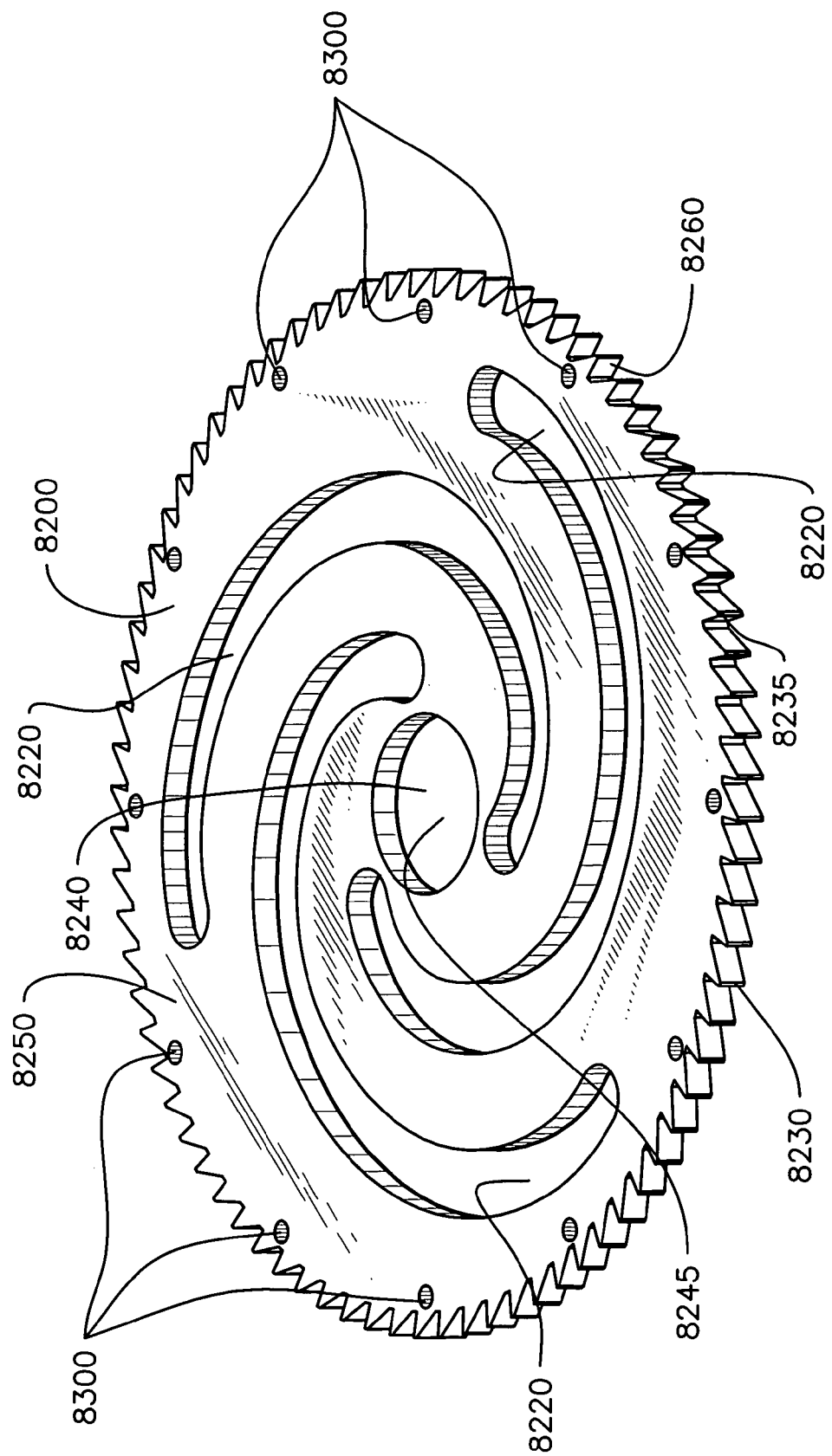
FIG. 20 illustrates the ratchet gear ring (8200).

In the preferred embodiment the at least one ratchet gear slot (8220), seen at FIG. 20, is a spiral with increasing radius from proximal the ratchet gear center (8240) to proximal the ratchet gear periphery (8230). However, those of ordinary skill in the arts will appreciate that a constant radius and other variable radius shapes will be found in alternate embodiments of the at least one ratchet gear slot (8220).

In an alternative embodiment the at least one rim securing flange (8100) will be comprised of at least two securing flanges (8100) equidistantly spaced and expending from the base plate assembly frame (8050) to engagement of the rim (7) by the at least two securing flanges (8100). In this alternative embodiment at least two ratchet gear slots (8220) are formed each receiving a tensioning slot flange (8150) from the respective securing flange (8100).

The tensioning slot flange bearing (8160) is, in the preferred embodiment, of rod or tube construction and is sized to be bearingly received by the at least one ratchet gear slots (8220). The slot flange top (8155) is dimensioned to have a top width greater than a slot width of the at least one ratchet gear slots (8220) in order to retain the tensioning slot flange (8150) and the tensioning slot flange bearing (8160) in bearing and movement relationship with the at least one ratchet gear slot (8220). The flange top (8130) is planar and bears on the ratchet gear bottom (8260).

In the preferred embodiment the at least one rim securing flange (8100) will be comprised of at least three securing flanges (8100), shown at FIGS. 7 to 9, equidistantly spaced and extending from the base plate assembly frame (8050) to allow engagement of the rim (7) by the at least three securing flanges (8100). It is appreciated that the spacing of the at least one securing flanges (8100) need not be equidistantly spaced.

As seen at FIGS. 14 to 17, the at least one rim securing flange first end (8110), in the preferred embodiment, is "C" shaped to engage the rim (7) which is generally circular or semi-circular in cross section. In the preferred embodiment at least three ratchet gear slots (8220) are formed each receiving a tensioning slot flange (8150) from the respective securing flange (8100).

The rotation of the ratchet gear (8200) slidably and bearingly acts on the at least one ratchet gear slot (8220) in combination with the at least one tensioning slot flange (8150) to extend or to retract the at least one rim securing flange (8100). The extension of the at least one rim securing flange (8100) is limited by the contact of the at least one slot flange top (8155) with the at least one inner periphery detent (9245).

The rim securing flange first end (8110), in a "C" shaped configuration has a rim securing flange first end right end (8111) having a right end width (8112), a rim securing flange first end middle (8115) having a middle width (8116), a rim securing flange first end left end (8117) having a left end width (8118) and a rim securing flange first end rim mating surface (8119). In the preferred embodiment the middle width (8116) is greater than the right end width (8112) and the left end width (8118) thereby reducing the likelihood that the at least one rim securing flange first end (8110) will be an impediment in the successful rotation of the bead rolling tool (9500) in dismounting or mounting a tire. The rim securing flange first end rim mating surface (8119), in the preferred embodiment, is convex and has a radius, from the rim securing flange first end right end (8111) to the rim securing flange first end left end (8117) which is congruent with a radius of the rim (7).

A safety cover (7116), illustrated in FIG. 7, is affixed to the receiver and drive assembly (7100). The safety cover (7116), in the preferred embodiment is planar and shaped to cover or enclose, for safety in discouraging access to the rotating assembly, the base plate assembly (8000). In the preferred embodiment the safety cover (7116) is plastic and does not withstand mechanical forces as the device is placed at a wheel for tire mount/dismount operations or during the operation of the apparatus. A safety cover center shaft aperture (7118) is centrally positioned to receive the center shaft (7171).

Figures 21, 21A:
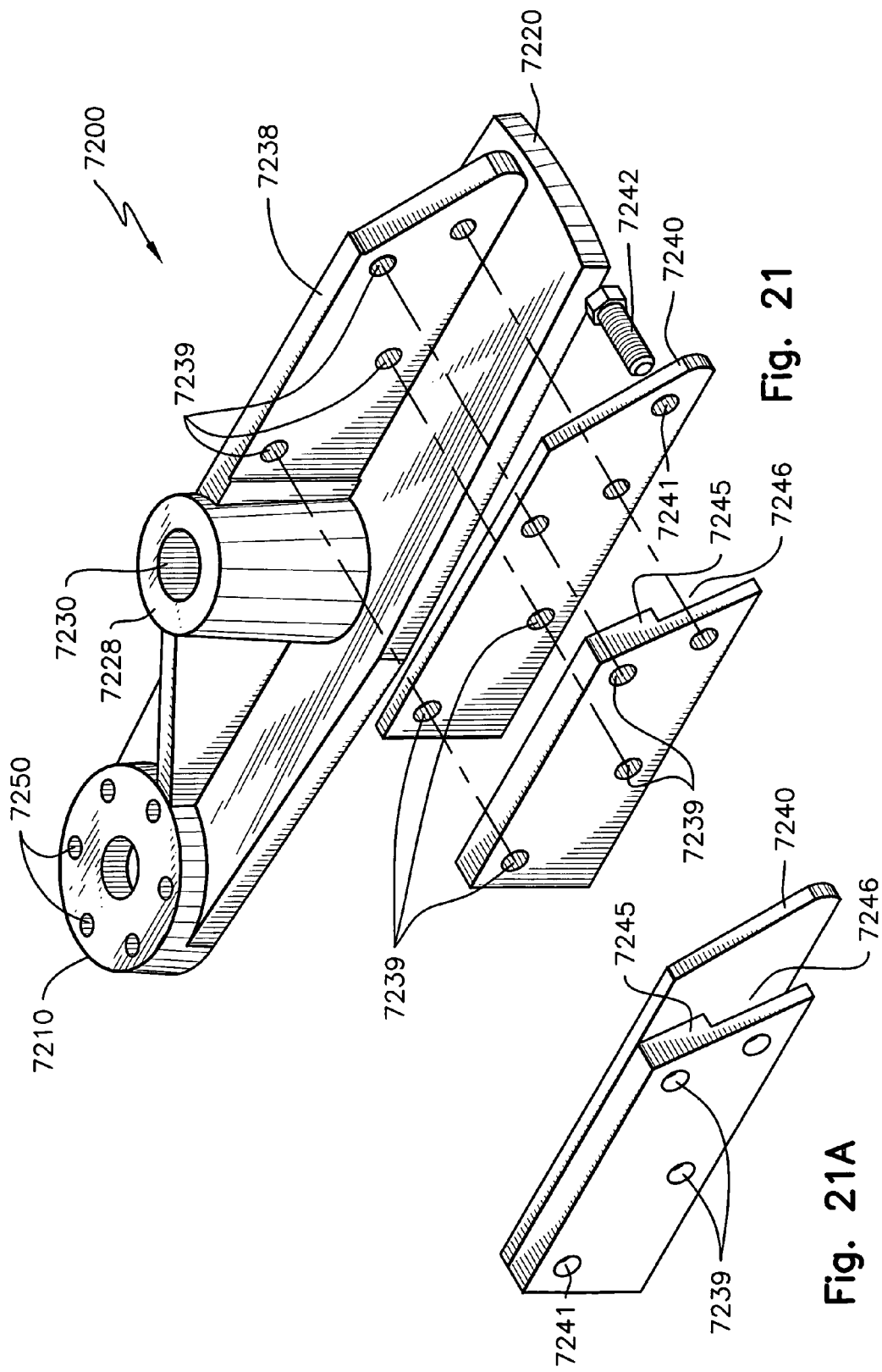
Figure 28:
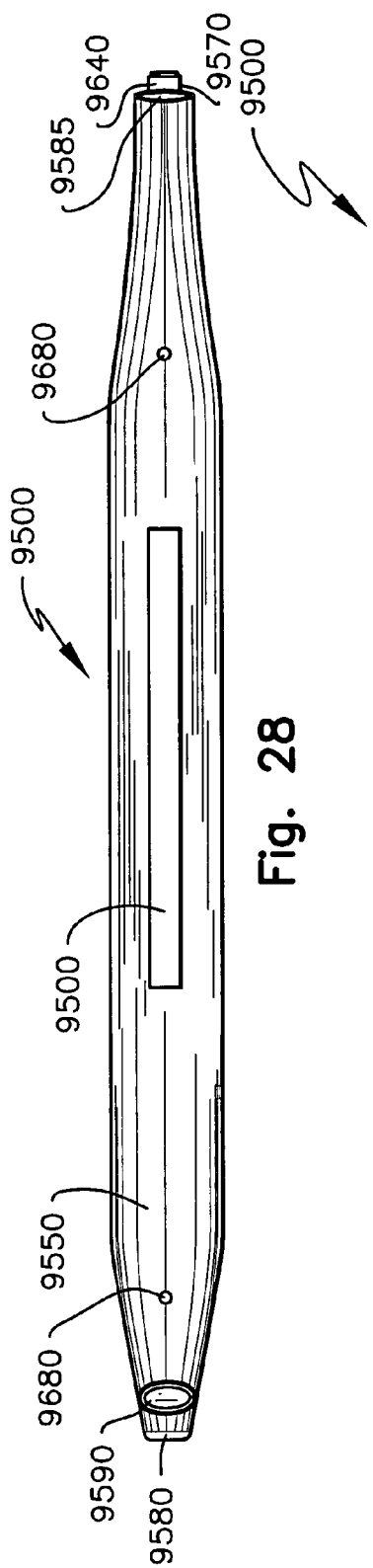
FIGS. 27, 28 and 29 are side elevation, top plan and bottom plan views of the bead rolling tool (9500).

The receiver (7200), seen at FIGS. 7 to 9 and 21 to 24 has a receiver top (7205), a receiver first end (7210), a receiver second end (7220) and an upstanding receiver hub (7207) intermediate the receiver first end (7210) and the receiver second end (7220). A receiver center (7228) at the receiver hub (7207) having a receiver center aperture (7230). The receiver (7200) at the receiver center aperture (7230) is rotatably receives the center shaft (7171). An upstanding planar receiver arm (7238) is rigidly affixed by receiver arm (7238) affixing means to the receiver hub (7207) generally by welding, machining or molding. The receiver arm (7238) extends upwardly from the receiver top (7205) and outwardly from the receiver hub (7207) toward the receiver second end (7220) and, in the preferred embodiment to or proximal to the receiver second end (7220). A bead rolling tool receiver (7240), in the preferred embodiment as seen in FIG. 21A, is formed by a molding generally from metal and is elongated and planar and is formed and shaped to mate with the receiver arm (7238) with receiver arm (7238) mating means. The bead rolling tool receiver (7240) extends outwardly toward the receiver second end (7220) and, in the preferred embodiment the bead rolling tool receiver (7240) extends outwardly from and distal to the receiver second end (7220). At least one bead rolling tool stop (7245) is formed and extends from proximal the hub outwardly toward, and in the preferred embodiment to, the receiver second end (7220). The bead rolling tool receiver (7240) and the at least one bead rolling tool stop (7245) are rigidly affixed to the receiver arm (7238) by bead rolling tool receiver affixing means including welding, bolt/nut, screws and other such mechanical means. In the preferred embodiment at least one bead rolling tool receiver aperture (7239) is formed in each of the receiver arm (7238), the bead rolling tool receiver (7240) wherein the respective at least one bead rolling tool receiver apertures (7239) are aligned and the at least one bead rolling tool receiver apertures (7239) in the bead rolling tool receiver (7240) are tapped to receive bolt affixing means from the receiver arm (7238). In the preferred embodiment at least four bead rolling tool receiver apertures (7239) are formed in alignment in each of the receiver arm (7238) and the bead rolling tool receiver (7240) and each receives bolt affixing means. In an alternative embodiment, as illustrated in FIG. 21, the bead rolling tool receiver (7240) and the bead rolling tool stop (7245) are separate units interconnected by bolt and threaded means via bead rolling tool receiver apertures (7239) receiving bolts. In the preferred embodiment and in the alternative embodiment, seen in FIGS. 21 and 21A, the bead rolling tool receiver (7240) has at least two bead rolling tool receiver apertures (7239) with one proximal the receiver second end (7220) and proximal the receiver top (7205), as illustrated in FIGS. 21 and 21A, and one intermediate the receiver hub (7207) and distal from the receiver top (7205) with each of said receiver apertures (7239) receiving bolt and threaded affixing means with the receiver arm (7238) with said affixing providing structural support to restrain the bead rolling tool receiver (7240) from bending most distal from the receiver hub (7207).

The shape of the bead rolling tool receiver (7240) proximal the receiver second end (7220) securely receives the bead tolling tool slot (9550) such that the bead rolling tool (9500) is not rotated as the receiver (7200) is rotated. In the preferred embodiment, the shape of the bead rolling tool receiver (7240) proximal the receiver second end (7220) is rectangular in cross-section to receive the bead rolling tool slot (9550), which is rectangular in the preferred embodiment.

The bead rolling tool stop (7245) and the receiver arm (7238) proximal the receiver second end (7220) slopes downwardly and outwardly toward the receiver second end (7220). The bead rolling tool receiver (7240) distal from the receiver second end (7220) slopes downwardly and outwardly. The slope of the bead rolling tool stop (7245), the receiver arm (7238) and the bead rolling tool receiver (7240) are, in the preferred embodiment, the same and are 45 degrees. The bead rolling tool stop (7245) and the receiver arm (7238) are stops for the bead rolling tool (9500) when received by the bead rolling tool receiver (7240).

The bead rolling tool (9500) is retained in position on the bead rolling tool receiver (7240) and against the receiver arm (7238) and the bead rolling tool stop (7245) by insertion of an elongated pin or bolt, here identified as a receiver retaining pin (7242), which is received at an aperture or other connection means, here identified as receiver retaining pin aperture (7241) at the bead rolling tool receiver (7240) distal the receiver second end (7220).

In the preferred embodiment the movable rotating drive means (7112) is affixed with movable rotating drive means (7112) affixing means, comprised generally of bolts, screws, welding and other mechanical means, proximal the receiver first end (7210). The slope of the at least one bead rolling tool stop (7245) and the receiver arm (7238), on which the bead rolling tool (9500) rests, may vary in angle to best position and or support the bead rolling tool at a favorable angle relative to the wheel (4).

In the preferred embodiment the bead rolling tool (9500) will pivot about the receiver retaining pin (7242) as the bead rolling tool (9500) engages the tire bead (8) at the rim (7) and will assume an angle, relative to the bead rolling tool stop (7245) depending on the dimensions of the wheel (4). Application of the bead rolling tool (9500) to a 19.5 inch truck tire will result, in the preferred embodiment, in the bead rolling tool stopping at the bead rolling tool stop (7245) proximal the receiver top (7205) and the receiver second end (7220) forming a bead rolling tool first angle Θ (9685) of approximately 20 degrees. Application of the bead rolling tool (9500) to a 24.5 inch truck tire will result, in the preferred embodiment, in the bead rolling tool stopping at the bead rolling tool stop (7245) distal to the receiver top (7205) and the receiver second end (7220) forming a bead rolling tool second angle Δ (9685) of approximately 39 degrees.

It will be appreciated, as shown in FIGS. 7 to 9 and 12-13, that the base plate assembly (8000) is a frame or positioning means for securing, relative to the wheel (4), the receiver and drive assembly (7100) such that the receiver and drive assembly (7100) may rotate relative to the wheel (4) permitting the bead breaking means, seen here as a bead rolling tool (9500), to move between a wheel rim (7) and tire bead (8). It will be appreciated that the base plate assembly (8000), functioning as a fixing means for attachment to a wheel (4) at the wheel rim (7) such that the receiver and drive assembly (7100) may rotate relative to the wheel (4).

Figure 10:
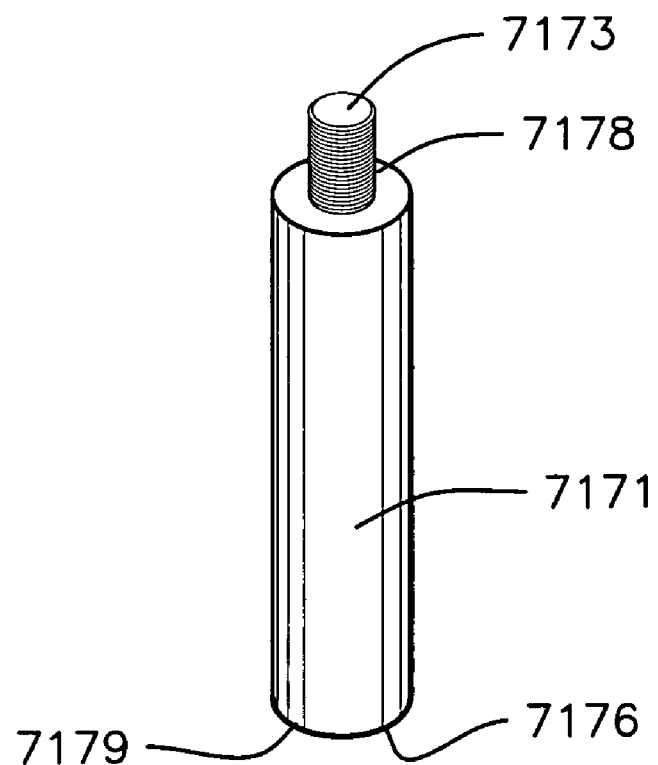
FIGS. 10 and 11 are a perspective view of the center shaft (7171) and a bottom plan view of the center shaft bottom (7176) and center shaft aperture (7179).
Figure 11:
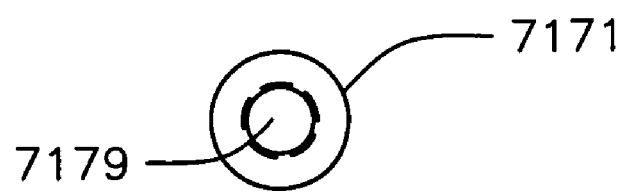
Figure 12:
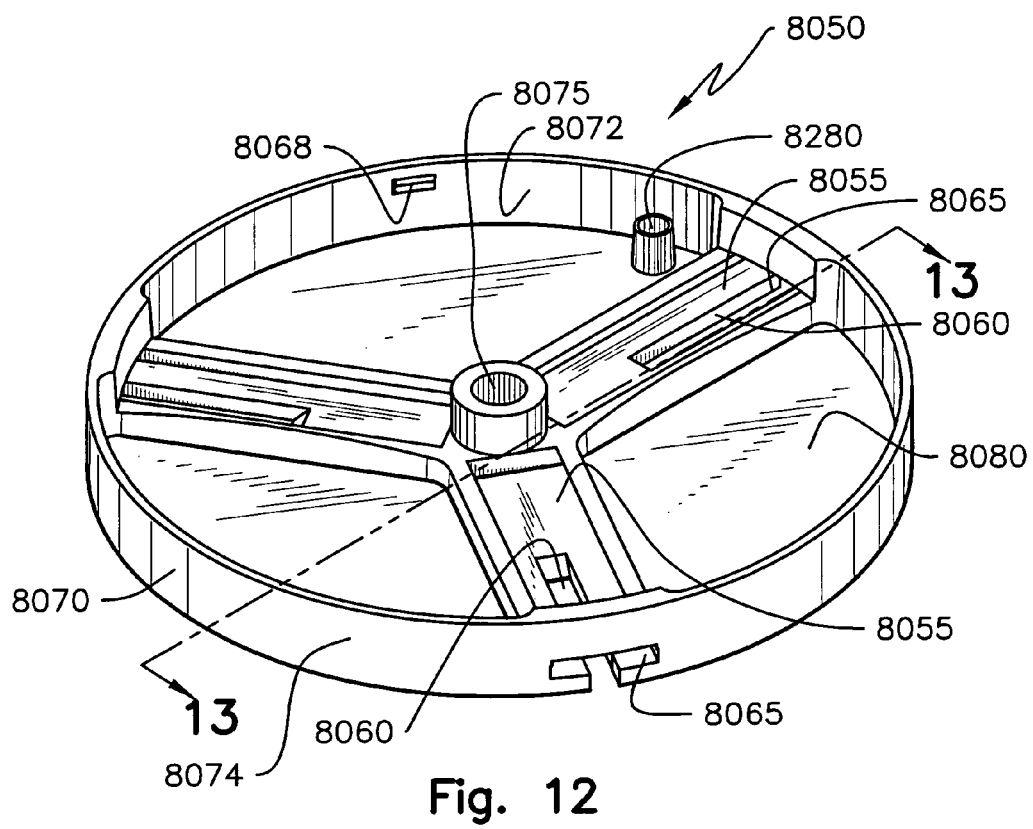
FIGS. 12 and 13 are a perspective view and a section view of the base plate assembly frame (8050).
Figure 13:
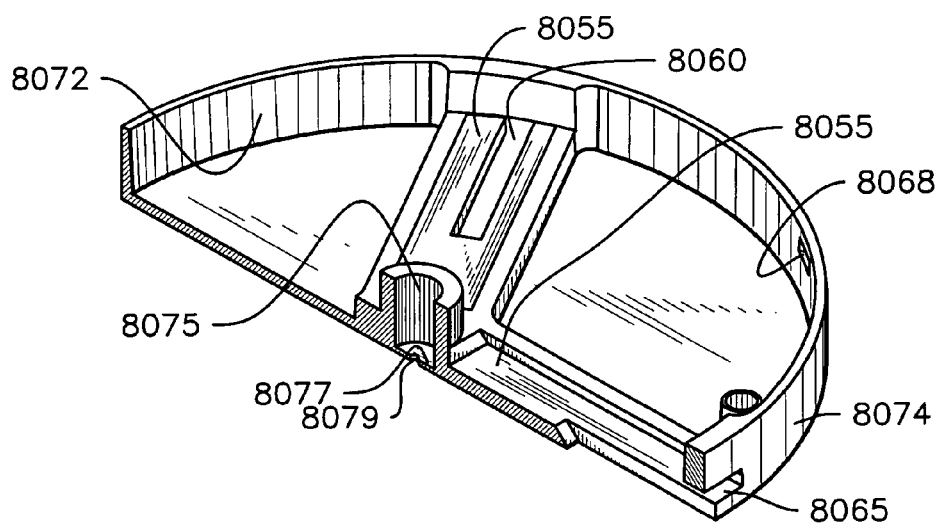

In the preferred embodiment a center shaft (7171), seen at FIGS. 7 and 10-11, is centrally positioned in relation to the concentrically related base plate assembly (8000) and receiver and drive assembly (7100) around which the receiver and drive assembly (7100) revolve. In the preferred embodiment the center shaft (7171) is cylindrical having a center shaft top (7173), center shaft top lock (7174) having a center shaft top lock bearing surface (7175), a center shaft bottom (7176), a center shaft handle shaft (7178) and a center shaft aperture (7179). The center shaft handle shaft (7178) is at the center shaft top (7173) and, in the preferred embodiment is threaded to be received into a female threaded aperture at the center shaft top lock (7174). The center shaft top lock (7174) has a center shaft top lock bearing surface (7175) which bears on the receiver center (7228).

The base plate assembly center aperture (8075) is aligned with the ratchet gear center shaft aperture (8245) and the safety cover center shaft aperture (7118). The center shaft (7171) is received by the aligned base plate assembly center aperture (8075), the ratchet gear center shaft aperture (8245) and the safety cover center shaft aperture (7118). In the preferred embodiment a bolt is received at the center aperture bottom (8077) through the center aperture bottom bolt hole (8079) and is rigidly affixed by bolt means to the center shaft (7171) at the threaded center shaft aperture (7179).

It will be seen that the center shaft (7171) depicted in the preferred embodiment is not a limiting structure and that there need be no center shaft (7171) but rather the rotatable interrelationship of the immovable base plate assembly (8000), relative to the wheel (4), or its equivalent and the receiver and drive assembly (7100) or its equivalent, e.g., the relationship between the base plate assembly (8000) and the receiver and drive assembly (7100) may be determined by the interconnection or interrelationship of drive means elements including rotating and stationary elements. Such is seen between moveable rotating drive means (7112) and stationary rotating means (8200).

THE BEAD ROLLING TOOL: FIGS. 7 to 9 and 25 to 43 illustrate the bead rolling tool (9500). The bead rolling tool (9500), as seen in FIGS. 25-34, has a bead rolling tool longitudinal axis (9520), a bead rolling tool top (9550), a bead rolling tool slot (9560), a bead rolling tool top groove (9560), a bead rolling tool first end (9570), a bead rolling tool second end (9580), a bead rolling tool first top extension (9585), a bead rolling tool second top extension (9590), a bead rolling tool bottom (9600), a bead rolling tool first bottom extension (9620), a bead rolling tool first end slot (9630), a bead rolling tool first end slot bearing (9640), a bead rolling tool second end slot (9650), a bead rolling tool second end slot bearing (9660).

The bead rolling tool (9500) is elongated having a bead rolling tool longitudinal axis (9520) centrally positioned and extending from the bead rolling tool first end (9570) to the bead rolling tool second end (9580). The bead rolling tool slot (9560) is coincident with the bead rolling tool longitudinal axis (9520) extending from the bead rolling tool top (9550) to the bead rolling tool bottom (9600) and intermediate the bead rolling tool first end (9570) and the bead rolling tool second end (9580).

The bead rolling tool slot (9560), seen in FIGS. 25, 26, 28 and 29, has a bead rolling tool slot first end (9562) and a bead rolling tool slot second end (9565). The bead rolling tool slot first end (9562) is proximal the bead rolling tool first end (9570). The bead rolling tool slot second end (9565) is proximal the bead rolling tool second end (9580). The bead rolling tool slot (9560) is sized to receive the bead rolling tool receiver (7240).

As seen in FIGS. 25, 26, 27 and 32, the bead rolling tool (9500) is curved toward the bead rolling tool top (9550) from proximal the bead rolling tool first end (9570) to the bead rolling tool first end (9570). The bead rolling tool first top extension (9585) is at or proximal the bead rolling tool first end (9570), is generally orthogonal to the bead rolling tool top (9550) and extends outwardly from the bead rolling tool top (9550). The bead rolling tool second top extension (9590) is at or proximal the bead rolling tool second end (9580), is generally orthogonal to the bead rolling tool top (9550) and extends outwardly from the bead rolling tool top (9550).

Figure 27:
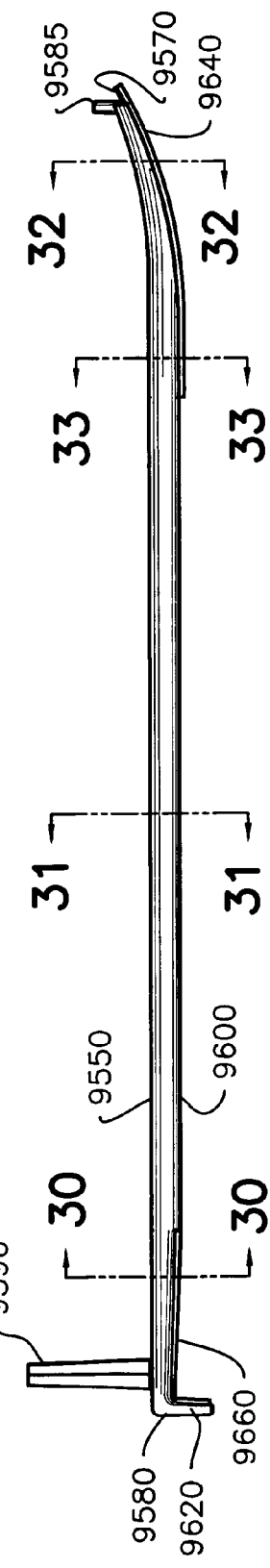
Figure 29:
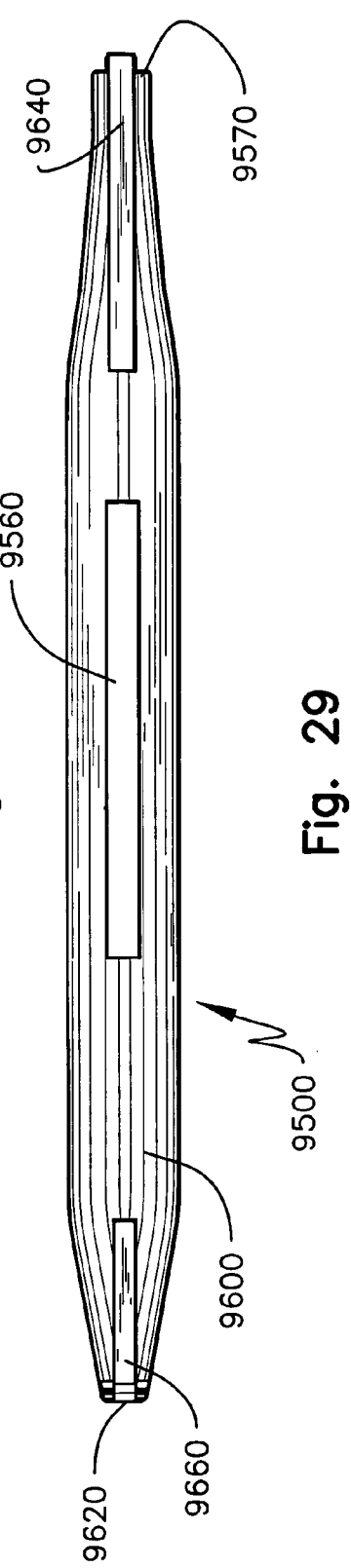
Figure 30:
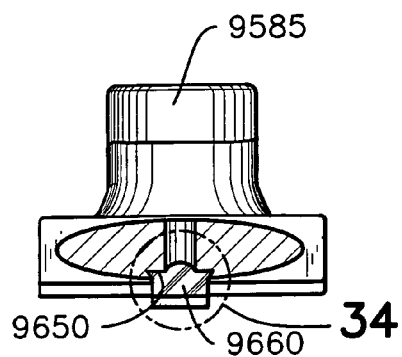
FIGS. 30, 31, 32, 33 and 34 are section views from FIG. 27 of the bead rolling tool (9500).
Figure 33:
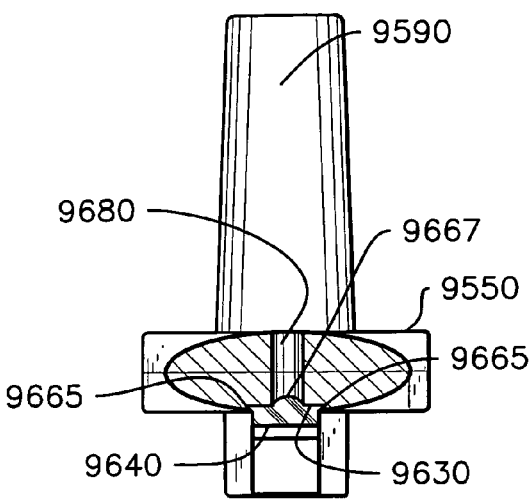
Figure 34:
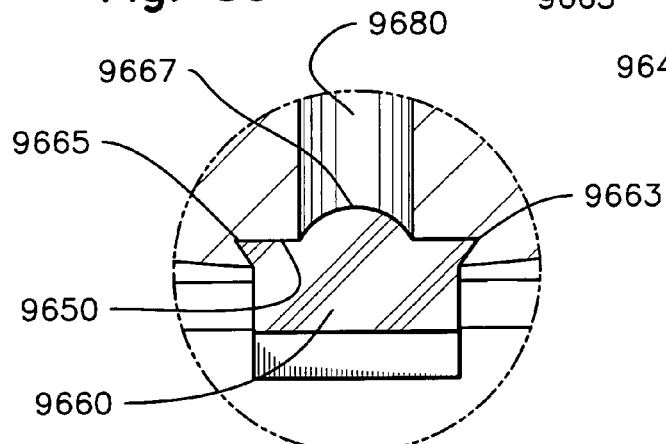
Figure 31:
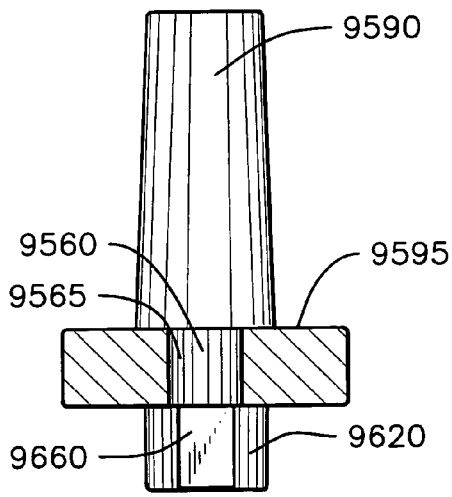
Figure 32:
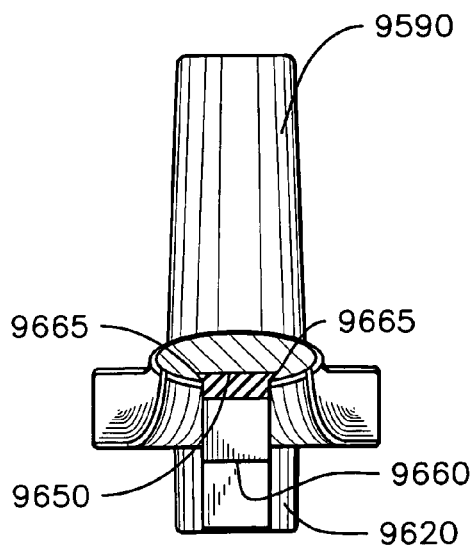

Cross-sections from FIG. 27 of the bead rolling tool (9500), in the preferred embodiment, are illustrated at FIGS. 30 through 34 and are as follows: re: the bead rolling tool (9500) orthogonal the bead rolling tool longitudinal axis (9520) and proximal the bead rolling tool slot (9560) are, in the preferred embodiment, rectangular; re: from proximal the bead rolling tool slot first end (9562) to the bead rolling tool first end (9570) and from proximal the bead rolling tool slot second end (9565) to the bead rolling tool second end (9580) are elliptical. Cross-sections, in the preferred embodiment are elliptical at the bead rolling tool first top extension (9585), the bead rolling tool second top extension (9590) and the bead rolling tool first bottom extension (9620).

The bead rolling tool (9500), in the preferred embodiment, is curved upwardly toward the bead rolling tool top (9550) from proximal the bead rolling tool slot (9560) to the bead rolling tool first end (9570). It is appreciated that the bead rolling tool (9500) may be straight from the bead rolling tool first end (9570) to the bead rolling tool second end (9580).

Bearing materials, illustrated at FIGS. 26, 27, 30-32 and 35-43, are provided at the bead rolling tool bottom (9660) to lessen friction and torque to be experienced by the bead rolling tool (9500). Bearing materials, in the preferred embodiment, include plastics. A bead rolling tool first end slot (9630), proximal and extending to the bead rolling tool first end (9570), is formed at the bead rolling tool bottom (9600) and extending toward and proximal the bead rolling tool top (9550) having a dovetail cut proximal the bead rolling tool top (9550) where the width of the first end slot (9630) proximal the bead rolling tool top (9550) is greater than the width proximal the bead rolling tool bottom (9600). A bead rolling tool first end slot bearing (9640), comprised in the preferred embodiment of a plastic strip shaped to be fixedly received into the bead rolling tool first end slot (9630) by compression and friction. The first end slot bearing (9640) having a cross-section showing a dovetail cross-section. The first end slot bearing (9640) having a slot bearing protrusion (9667), upwardly extending, at the surface of the first end slot bearing (9640) most proximal the bead rolling tool top (9550). A slot bearing removal aperture (9680) is formed proximal the bead rolling tool first end (9570) and proximal the bead rolling tool second end (9580) from the bead rolling tool top (9550) to the bead rolling tool bottom (9600). The first end slot bearing (9640) slot bearing protrusion (9667) is aligned with and detents into the slot bearing removal aperture (9680) proximal the bead rolling tool first end (9570).

A bead rolling tool second end slot (9650), proximal the bead rolling tool first bottom extension (9620), is formed at the bead rolling tool bottom (9600) and extending toward and proximal the bead rolling tool top (9550) having a dovetail cut proximal the bead rolling tool top (9550). A bead rolling tool second end slot bearing (9660), comprised in the preferred embodiment of a plastic strip shaped to be fixedly received into the bead rolling tool second end slot (9650) by compression and friction. The second end slot bearing (9660) having a cross-section showing a dovetail cross-section. The second end slot bearing (9660) having a slot bearing protrusion (9667), upwardly extending, at the surface of the second end slot bearing (9660) most proximal the bead rolling tool top (9550). A slot bearing removal aperture (9680) is formed proximal the bead rolling tool second end (9580) from the bead rolling tool top (9550) to the bead rolling tool bottom (9600). The second end slot bearing (9660) slot bearing protrusion (9667) is aligned with and detents into the slot bearing removal aperture (9680) proximal the bead rolling tool second end (9580).

METHOD OF USE OF THE APPARATUS: It will be understood that the installation of the tire mount/dismount module (60) comprises the following steps:

1. The tire (6) is deflated.
2. The tire bead breaker module (110), or other bead breaking means, is employed to break the bead (8) from the rim (7).
3. The tire mount/dismount module (60) is viewed and the at least one rim securing flange (8100) and rim securing flange first end (8110) are extended or retracted by hand rotation. If the at least one rim securing flange (8100) is short then, with the apparatus on the ground, the receiver is rotated clockwise to extend the at least one rim securing flange (8100) and, if too long retracted by rotation counter clockwise.
4. Then at least one of the at least one rim securing flange (8100) at the rim securing flange first end (8110) is positioned, generally by grasping the drive means (7130) and the bead rolling tool receiver (7240), proximal the wheel front (12) or the wheel rear (14) over the rim (7) at a 12 o'clock position. Then the receiver is rotated to retract the at least one rim securing flange (8100) to engage the rim (7).
5. The at least one rim securing flange first end (8110) is engaged with the rim (7). The remaining at least one rim securing flange first ends (8110) are adjusted by rotation of the ratchet gear ring (8200) and stationary ring gear (9200) thereby extending or retracting the remaining at least one rim securing flange first ends (8110) to be proximal the rim (7).
6. Power is supplied to the drive means (7130) which rotates the drive gear (7112).
7. The drive gear (7112), engaged with the stationary ring gear (9200), rotates the stationary ring gear (9200).
8. The spiral or other radius at least one ratchet gear slot (8220) slidably and bearingly engages the tensioning slot flange bearing (8160) thereby drawing the at least one rim securing flange first end (8110) toward the ratchet gear center (8240) and hence immovebly tightening the at least one rim securing flange first end (8110) against the rim (7) and engaging the ratchet pawl (8270) with the ratchet gear teeth (8235).
9. When the at least one rim securing flange first end (8110) is immovebly tightened against the at least one rim, the bead rolling tool (9500) is inserted between the bead (8) and the rim (7) and is then levered down and received by the bead rolling tool receiver (7240).
10. Power is applied to rotate the drive gear (7112) which will cause the receiver and drive assembly (7100) to rotate thereby rotating the bead rolling tool (9500) and causing the tire (6) to be dismounted or mounted.
11. The safety cage (9800) is installed. The tire mount/dismount unit (7000) remains in place, relative to the wheel, during inflation of the newly mounted tire.
12. On conclusion of use of the tire mount/dismount unit (7000) the ratchet pawl release handle (8275) is depressed thereby disengaging the ratchet pawl (8270) from the ratchet gear teeth (8235) and allowing rotation to extend the at least one rim securing flange (8100) and removal of the tire mount/dismount unit (7000). 13. Thereafter the tire mount/dismount unit (7000) is removed from the wheel.

The safety cage (9800), illustrated at FIGS. 7 to 9, will afford a degree of containment of the explosive nature of a tire rupture during inflation. The preferred safety cage (9800) embodiment is composed of a center shaft mount (9820) having spokes (9840) from the center shaft mount (9820) to a generally circular mounting handle (9860). The generally circular mounting handle (9860) provides the structure to be impacted upon tire rupture and provides a protective barrier between the operator and the tire. The center shaft mount (9820) is securely affixed by center shaft mount means to the center shaft center shaft top lock (7174). Center shaft mount means includes threaded aperture at the center shaft mount (9820) receiving the threaded center shaft top (7173), by detent, bolt/nut and other mechanical means commonly recognized by those of ordinary skill in the mechanical arts.

Center shaft mount means includes threads, bolt/nut, pin and other means of affixing a handle to a shaft as is appreciated by those of ordinary skills in the mechanical arts. In the preferred embodiment the center shaft mount (9820) is via the center shaft handle shaft (7178) threads received into a female threaded aperture at the center shaft mount (9820).

While a preferred embodiment of the present disclosure has been shown and described, it will be apparent to those skilled in the art that many changes and modifications may be made without departing from the disclosure in its broader aspects. The appended claims are therefore intended to cover all such changes and modifications as fall within the true spirit and scope of the disclosure.

I claim:
1. A tire bead rolling tool, comprising:
an elongated bead rolling tool body having first and second opposing ends, wherein the tool has a cross-section which is approximately elliptical in the vicinity of both the first and second ends;
a first projection extending outwardly from just a top surface of the tool, in the vicinity of the first end of the tool;
a second projection, also extending outwardly from just a top surface of the tool, in the vicinity of the second end of the tool;
a third projection extending outwardly from just a bottom surface of the tool, at the second end of the tool, wherein the third projection is approximately elliptical in cross-section; and
bearings in the vicinity of the first and second ends on the bottom surface of the tool for contact with a rim of a wheel on which the tool is used.
2. The tire bead rolling tool of claim 1, wherein the third projection is shorter than the second projection and is slightly outboard of the second projection.
3. The bead rolling tool of claim 1, including a slot extending through the body of the tool approximately intermediate of the first and second ends thereof for mounting of the tool on a tire mount/dismount apparatus.
4. The bead rolling tool of claim 1, wherein the bearings are plastic and are mounted so as to be replaceable.
5. The bead tolling tool of claim 4, wherein the bearings each engage an associated bearing slot in the tool body, the bearing slots having a dovetail configuration in cross-section, and wherein the bearings have a mating dovetail configuration, tending to prevent each bearing from coming out of its associated bearing slot in use.
6. The bead rolling tool of claim 1, wherein the body of the tool is curved in the vicinity of the first end thereof, wherein the second and third projections are approximately orthogonal to the longitudinal axis of the tool, and wherein the first, second and third projections are approximately parallel relative to the tool body.
7. The bead rolling tool of claim 1, wherein the tool is narrower at the first and second ends than at an intermediate portion thereof.
8. The bead rolling tool of claim 1, including apertures which extend from a top surface of the tool body to the bearing slots, allowing for removal of the bearing members from their slots.
9. The bead rolling tool of claim 1, wherein the first and second projections are also elliptical in cross section.
10. A tire bead rolling tool, comprising:
an elongated bead rolling tool body having first and second opposing ends;
a first projection extending outwardly from a top surface of the tool in the vicinity of the first end of the tool;
a second projection, also extending outwardly from the top surface of the tool, in the vicinity of the second end of the tool;
a third projection extending outwardly from a bottom surface of the tool, at the second end of the tool; and
bearings in the vicinity of the first and second ends on the bottom surface of the tool for contact with a rim of a wheel on which the tool is used, wherein the bearings are plastic and are mounted so as to be replaceable, the bearings each engaging an associated bearing slot in the tool body, the bearing slots having a dovetail configuration in cross-section, and wherein the bearings have a mating dovetail configuration, tending to prevent each bearing from coming out of its associated bearing slot in use.

\* \* \* \* \*